United States Patent
Prieto et al.

(10) Patent No.: US 10,483,032 B2
(45) Date of Patent: Nov. 19, 2019

(54) FLEXIBLE VOLTAGE TRANSFORMATION SYSTEM

(71) Applicant: ABB Schweiz AG, Baden (CH)

(72) Inventors: Alberto Prieto, Cary, NC (US); Ion C. Radu, Laval (CA); Nikolaus Zant, Raleigh, NC (US); Sandeep Bala, Raleigh, NC (US); Matthew Lee Henriksen, Raleigh, NC (US); Parag Upadhyay, Morrisville, NC (US)

(73) Assignee: ABB Schweiz AG, Baden (CH)

( * ) Notice: Subject to any disclaimer, the term of this patent is extended or adjusted under 35 U.S.C. 154(b) by 4 days.

(21) Appl. No.: 15/961,413

(22) Filed: Apr. 24, 2018

(65) Prior Publication Data

US 2018/0308632 A1    Oct. 25, 2018

Related U.S. Application Data

(60) Provisional application No. 62/489,197, filed on Apr. 24, 2017.

(51) Int. Cl.
| | |
|---|---|
| G05F 1/14 | (2006.01) |
| H01F 29/02 | (2006.01) |
| G05F 1/16 | (2006.01) |
| G05F 1/20 | (2006.01) |
| H02M 5/22 | (2006.01) |

(52) U.S. Cl.
CPC ............... *H01F 29/02* (2013.01); *G05F 1/14* (2013.01); *G05F 1/16* (2013.01); *G05F 1/20* (2013.01); *H02M 5/225* (2013.01)

(58) Field of Classification Search
CPC ........................................................ G05F 1/14
See application file for complete search history.

(56) References Cited

U.S. PATENT DOCUMENTS

| | | |
|---|---|---|
| 3,560,843 A | 2/1971 | Nakagawa et al. |
| 4,862,307 A | 8/1989 | Larson et al. |
| (Continued) | | |

FOREIGN PATENT DOCUMENTS

| | | |
|---|---|---|
| CN | 101645346 A | 2/2010 |

OTHER PUBLICATIONS

ABB, Transformer Handbook, dated 2004, 213 pages, Zurich, Switzerland.

(Continued)

*Primary Examiner* — Yusef A Ahmed
*Assistant Examiner* — Ishrat F Jamali
(74) *Attorney, Agent, or Firm* — Taft Stettinius & Hollister LLP; J. Bruce Schelkopf

(57) ABSTRACT

Unique systems, methods, techniques and apparatuses of a modular power transformer are disclosed. One exemplary embodiment is a matrix power transformer including a plurality of block assemblies each including a plurality of transformer modules, each transformer module including a primary winding coupled to an input and a secondary winding coupled to an output, the inputs of each transformer module in one block assembly being coupled together and the outputs of each transformer block being coupled together. One of the secondary windings includes a plurality of taps structured to be selectively coupled to the output of the associated transformer module assembly or another secondary winding of the associated module assembly.

33 Claims, 14 Drawing Sheets

(56) References Cited

U.S. PATENT DOCUMENTS

| | | | |
|---|---|---|---|
| 7,692,523 | B2 | 4/2010 | Colmenero et al. |
| 8,379,416 | B1* | 2/2013 | Datta .................. H02M 5/4505 363/34 |
| 2002/0176265 | A1 | 11/2002 | Oates |
| 2007/0295692 | A1* | 12/2007 | Muench ................ H01F 27/321 218/83 |
| 2010/0090543 | A1 | 4/2010 | Cobb et al. |
| 2010/0201338 | A1 | 8/2010 | Haj-Maharsi et al. |
| 2014/0210214 | A1 | 7/2014 | Campion et al. |
| 2015/0263636 | A1 | 9/2015 | Bala |
| 2016/0087548 | A1* | 3/2016 | Jezierski, Jr. ........... H02M 7/44 363/71 |
| 2017/0244312 | A1* | 8/2017 | Normann ................. H02K 7/10 |

OTHER PUBLICATIONS

ABB Ltd., "Phase shifting transformers—Reliable and efficient power flow control," Power Transformers, dated 2011, 8 pages, Zurich, Switzerland.
Siemens Energy, Inc., "Phase shifting transformers—Principles, design aspects and operation," Phase Shifter Application Workshop, dated Mar. 2015, 56 pages, Siemens Transformers, Weiz, Austria.
K. K Sen et al., "Introducing the family of 'Sen' transformers: A set of power flow controlling transformers," IEEE Transactions on Power Delivery, dated Jan. 2003, pp. 149-157, vol. 18, No. 1, IEEE.
K. K. Sen et al., "Comparison of the 'Sen' transformer with the unified power flow controller," IEEE Transactions on Power Delivery, dated Oct. 2003, pp. 1523-1533, vol. 18, No. 4, IEEE.
D. Divan et al., "Controllable network transformers," Power Electronics Specialists Conference, dated Aug. 8, 2008, pp. 2340-2345, IEEE.
ABB Power Technology, S.A., "The polytransformer—The multivoltage substation power transformer," ABB Polytransformer brochure, dated 2005, 12 pages, Cordoba, Spain.
J. A. Ebert, "Criteria for reliable dual voltage power transformers," IEEE Transactions on Power Delivery, dated Apr. 1995, pp. 845-852, vol. 10, No. 2, IEEE.
E. Herbert, Design and Application of Matrix Transformers and Symmetrical Converters, dated Apr. 24, 1990, 174 pages, FMTT, Inc., Canton, Connecticut.
Asea Brown Boveri, S.A., "High voltage mobile power transformers—Solving contingencies in transmission and distribution," ABB Mobile Transformer product leaflet, dated 2011, 2 pages, Cordoba, Spain.
S. Inoue et al., "A bidirectional isolated DC-DC converter as a core circuit of the next-generation medium-voltage power conversion system," IEEE Transactions on Power Electronics, dated Mar. 2007, pp. 535-542, vol. 22, No. 2, IEEE.
E. Ronan et al., "A power electronic-based distribution transformer," IEEE Transactions on Power Delivery, dated Apr. 2002, pp. 537-543, vol. 17, No. 2, IEEE.
H. Liu et al., "Research of the input-parallel output-series inductive power transfer system," 2015 IEEE PELS Workshop on Emerging Technologies: Wireless Power (WoW), dated Jun. 25, 2015, 7 pages, IEEE.
International Searching Authority, International Search Report and Written Opinion for corresponding Application No. PCT/US2018/029188, dated Oct. 3, 2018, 11 pages.

* cited by examiner

FLEXIBLE VOLTAGE TRANSFORMATION SYSTEM

CROSS REFERENCE TO RELATED APPLICATION

This application claims priority under 35 U.S.C. 119(e) from U.S. Provisional patent application No. 62/489,197 filed on Apr. 24, 2017, entitled "Flexible Voltage Transformation System" which is hereby incorporated by reference in its entirety.

TECHNICAL FIELD

The present disclosure relates to a modular power transformer and more particularly to a power transformer including a plurality of transformer modules selectively interconnected.

BACKGROUND

Power transformers are used in the transmission of energy from a point of energy generation to a point of energy use. The generated energy is often transmitted over long distances at high voltages to a substation where a transformer reduces the voltage level of the transmitted power for consumer consumption.

The power transformer includes primary windings, which receive varying currents and voltages to generate varying magnetic flux in a transformer core. The varying magnetic flux induces voltage in secondary windings, which provides output voltages and currents. The values of the output voltages and currents are directly related to the input voltages and currents as a result of the ratio of the number of turns of primary windings to the number of turns of secondary windings.

While the construction of a power transformer can appear to be relatively straightforward, medium and large power transformers suffer from certain disadvantages. For instance, such power transformers have a high non-recurring engineering effort. Very few "mass-produced" units (multiple units of the same size, shape, and electrical characteristics) are generally possible due to site-specific voltage, impedance, and cost requirements. On average, only 1.3 transformer units are built for each particular application, consequently multiple transformer units of the same type not needed. Power transformers also require a relatively high production lead time. Typically, more than five months are required from an initial customer request to a final delivery of the transformer.

Power transformers are also difficult to transport. A single transformer can weigh one-hundred (100) tons, or more, and cannot be easily transported over existing roads. Due to these difficulties, special transportation arrangements are required to select an adequate roadway and to select a time of delivery, often during the middle of the night to reduce the ill effects on traffic flow. When a transformer fails, the failure is experienced as a single point of failure. If something goes wrong with the power transformer, the entire transformer unit goes offline, which affects the entire system to which it provides energy. These failures are especially problematic at certain power substations that are deemed "critical." What is needed, therefore, is a power transformer that overcomes these deficiencies.

SUMMARY

Exemplary embodiments include unique systems, methods, techniques and apparatuses for a modular power transformer. Further embodiments, forms, objects, features, advantages, aspects and benefits of the disclosure shall become apparent from the following description and drawings.

In one embodiment, there is provided a matrix power transformer system including a first transformer block including a first plurality of transformer module assemblies, wherein each of the first transformer module assemblies includes a primary winding having an input and an output and a secondary winding having an input and an output. A second transformer block includes a second plurality of transformer module assemblies. Each of the second plurality of transformer module assemblies includes a primary winding having an input and an output and a secondary winding having an input and an output, wherein the primary windings of the first plurality of transformer module assemblies are coupled to the primary windings of the second plurality of transformer module assemblies. The secondary windings of each of the first transformer module assemblies are coupled to the secondary windings of another of the first plurality of transformer module assemblies, and the secondary windings of each of the second plurality of transformer module assemblies are coupled to the secondary windings of another of the second plurality of transformer module assemblies.

In another embodiment, there is provided a matrix power transformer system including a first transformer block including a first plurality of transformer module assemblies, wherein each of the first transformer module assemblies includes a primary winding having an input and an output and a secondary winding having an input and an output. A second transformer block includes a second plurality of transformer module assemblies, wherein at least one of the second plurality of module assemblies includes a selectable or adjustable impedance using regulating windings with tap changers, which are adjustable when online or when offline.

In still another embodiment, there is provided a matrix power transformer system including one or more transformer blocks, wherein each of the transformer blocks includes a plurality of transformer module assemblies. Each of the transformer module assemblies includes a primary winding and a secondary winding, wherein the primary windings of each of the transformer module assemblies are coupled to the primary windings of another of the plurality of transformer module assemblies. The secondary windings of each of the transformer module assemblies are coupled to the secondary windings of another of the first plurality of transformer module assemblies. At least one of the plurality of transformer module assemblies includes a selectable or adjustable impedance using regulating windings with tap changers, which are adjustable when online or when offline.

The matrix power transformer system, which includes a plurality of transformer blocks, reduces the amount of non-recurring engineering effort, since the same blocks can be used at multiple voltages, power levels, and impedances. By having a repeatable transformer block, production lead times are reduced because blocks can be manufactured and kept as inventory by a vendor or by a customer, such as a utility, for use at locations with different requirements. Transportation costs are also reduced because each block is transportable by road, rather than by special arrangements (e.g. railcars). In addition, there is no longer a single point of failure because blocks connected in parallel can be taken offline and replaced one at a time.

In addition to the performance enhancements provided by a matrix power transformer system, system requirements encountered by a transformer designer or manufacturer are relaxed. For instance, thermal management requirements are relaxed due to spatial spreading of the heat sources resulting from the capability of combining transformer blocks in desired configurations. Likewise, mechanical requirements are relaxed due to the distribution of the short circuit forces. Cost reductions, therefore, are achieved due to the mass production of standardized components and subcomponents.

DETAILED DESCRIPTION OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. In addition, while industrial systems include many different types and kinds of pieces of equipment, devices, components, and installation, these terms are used interchangeably herein unless otherwise noted. It shall, nevertheless, be understood that no limitation of the scope of the present disclosure is thereby created, and that the present disclosure includes and protects such alterations, modifications, and further applications of the exemplary embodiments as would occur to one skilled in the art with the benefit of the present disclosure.

Figure 1:
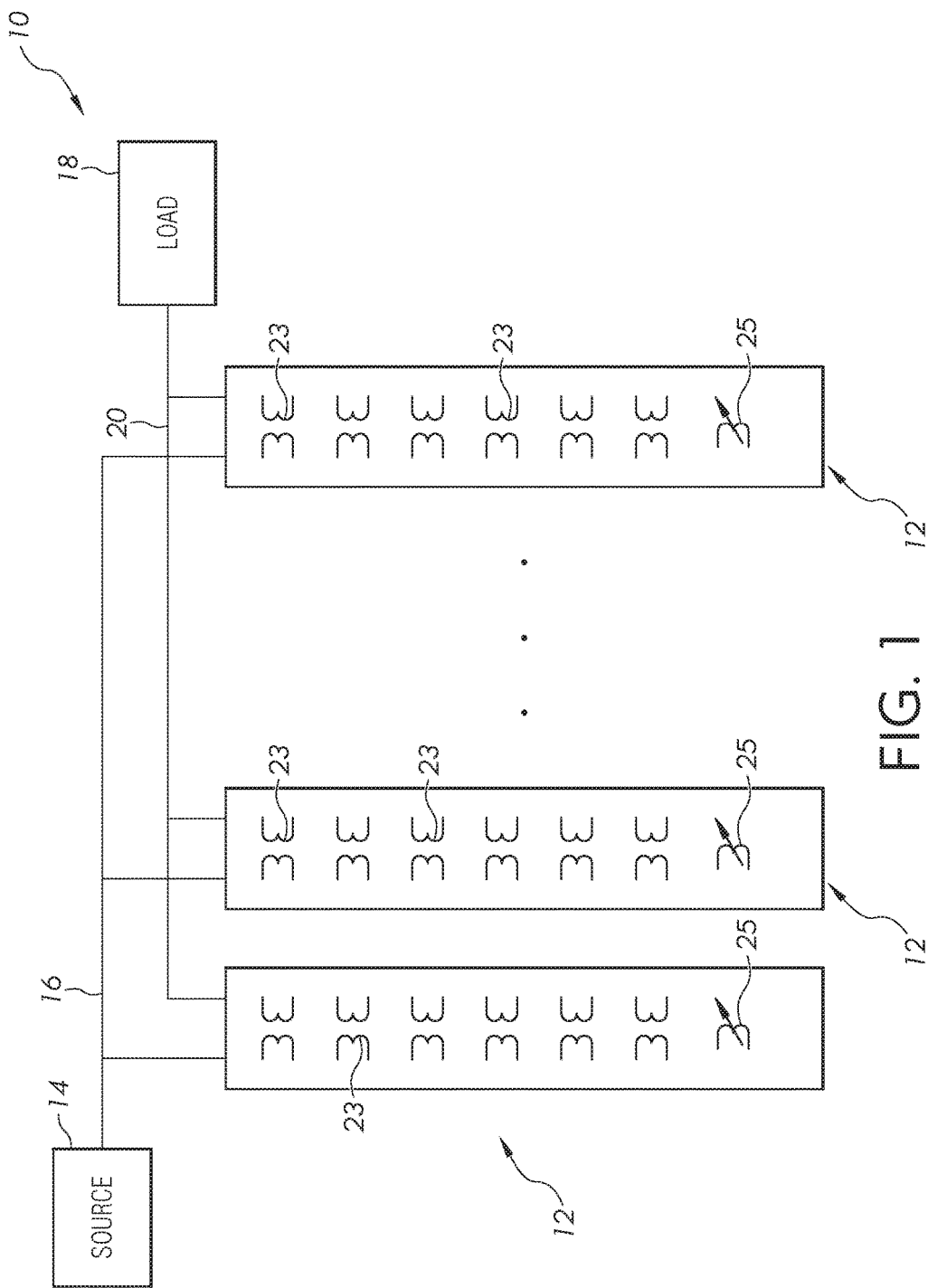
FIG. 1 is a schematic diagram of an exemplary voltage transformation system including a matrix power transformer.

FIG. 1 illustrates a schematic diagram of a power matrix transformer system or assembly 10 including a plurality of power transformer block assemblies 12, or blocks 12. Each of the block assemblies 12 is configured to be operatively connected to a source of energy 14 over a power input line 16. Each of the blocks 12 is further configured to be operatively connected to a load 18 over a power output line 20. Each of the transformer blocks 12 includes one or more transformer module assemblies 23, or modules 23. In addition to each of the modules 23, a flexible impedance module 25 is included structured to adjust the impedance of the associated block 12 so as to match the impedance of another block 12. While the illustrated embodiment shows each of the blocks 12 including the same number of modules 23, in other embodiments, the blocks 12 include different numbers of modules 23. In addition, while each of the blocks 12 is shown as including a single flexible impedance module 25, in other embodiments the blocks 12 may or may not include a single flexible impedance module. In still another embodiment, only one of the blocks 12 includes a flexible impedance module.

In at least one embodiment, each of the blocks 12 is configured to be a transportable block including a plurality of standardized transformer modules that are selectively interconnected to function as a power transformer with selectable voltage levels, turns ratios, and impedances. Blocks may be assembled at a manufacturing facility and separately transported to a remote location, such as a substation, and coupled together between an AC power source and a load so as to form a modular power transformer. These features are configured to implement medium or large power transformers, in particular, having a total power rating of greater than one-hundred (100) megavolt ampere (MVA) and high-side voltages above one hundred (100) kilovolts (kV). While medium or large power transformers are considered, other sizes of transformers are contemplated.

By providing a plurality of individual transformer blocks 12, a completed transformer is more easily delivered and assembled at a final destination, since each of the blocks 12 is separately transportable, if desired. In different embodiments, a power transformer system has one or more power transportable blocks, wherein each of the blocks includes a weight of approximately less than forty (40) tons having a size that approximates the dimensions of a standard shipping container. Shipping containers are of different sizes, but readily available shipping containers can be twenty (20) feet or forty (40) feet long, eight (8) feet wide, and eight (8) feet, six (6) inches high. Other dimensions are also contemplated.

Each individual block 12 performs the function of a power transformer and includes an enclosure (tank), high voltage (HV) terminals, low voltage (LV) terminals, bushings, a mechanism to dissipate heat, and other devices and equipment used in a power transformer.

In one exemplary embodiment, the blocks 12 are operatively connected in parallel to achieve a higher power rating. In particular, HV terminals of the blocks are connected in parallel and LV terminals of the blocks are connected in parallel.

Because each of the blocks is configurable to include the same components, one type of design is achieved with a predetermined number of blocks, while a second type of design is achieved with the same types of blocks, but in different numbers of blocks or in different configurations. The problems associated with high, non-recurring engineering efforts and high production and assembly lead times are therefore reduced.

As shown in FIG. 1, each of the blocks 12 includes two or more standardized transformer modules 23. Each of the modules 23 includes the same core, the same primary winding, and the same secondary winding that are interconnected offline before the matrix transformer system 10 is constructed at a final destination. By determining the construction of each individual module 23 ahead of final installation, each transformer block 12 is well suited to the application for which the final transformer system is applied.

FIGS. 2A-2D illustrate schematic diagrams of the transformer module 23 having different configurations to show that, in different embodiments, the same set of transformer modules can be configured to operate at different voltage levels and turns ratios to achieve a final power transformer system depending on the construction.

Figure 2D:
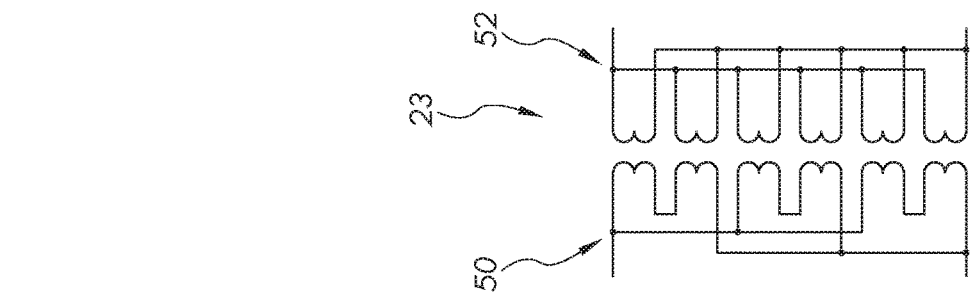
FIGS. 2A-2D are schematic diagrams of a plurality of exemplary power transformer modules for matrix power transformers.
Figure 2C:
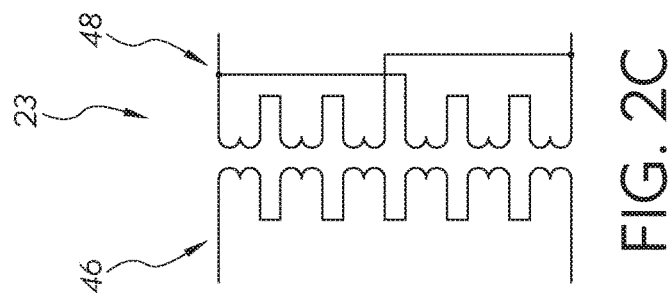
Figure 2B:
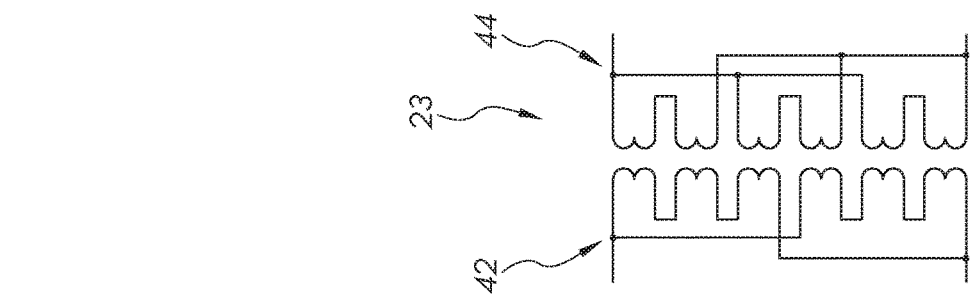
Figure 2A:
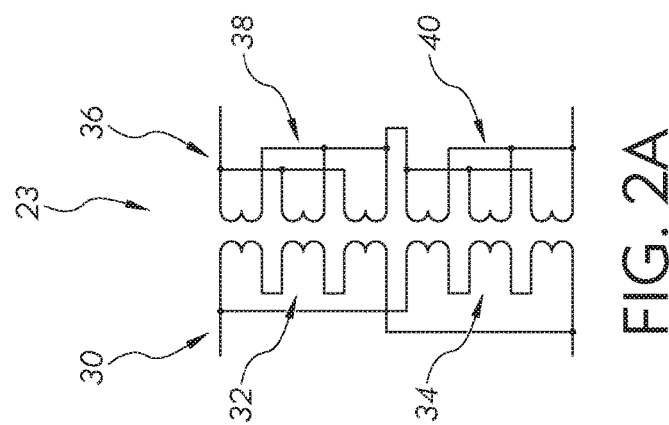

In the embodiment of FIG. 2A, a primary winding 30 includes a first primary winding 32 of three windings W1 in series and a second primary winding 34 of three windings W1 in series. The first and second windings are connected in parallel. This primary winding configuration is designated as a 3S-2P module, which is three windings in series and two windings in parallel. A secondary winding 36 includes a first secondary winding 38 of three windings W2 in parallel and second secondary winding 40 of three windings W2 in parallel. The first secondary winding 38 and the second secondary winding 40 are coupled in series. This secondary winding is designated as 3P-2S, which is three windings in parallel and two in series. The effective turns ratio is equal to $3N_1/2N_2$. $N_1$ is the number of turns of primary winding W1 and $N_2$ is the number of turns of secondary winding W2.

In the embodiment of FIG. 2B, a primary winding 42 is configured as 3S-2P. A secondary winding is configured as 2S-3P. In this embodiment, the voltage and turns ratio are the same as FIG. 2A. Implementation is, however, slightly different. The secondary winding includes three groups of windings connected in parallel. Each group contains two windings connected in series.

In FIG. 2C, a primary winding 46 is configured as 6S. A secondary winding 48 is configured as 3S-2P. In this embodiment, the effective turns ratio is equal to $6N_1/3N_2$.

FIG. 2D illustrates an additional embodiment of a module 23 having a primary winding 50 configured as 2S-3P. A secondary winding 52 is configured as 6P. In this embodiment, the effective turns ratio is $2N_1/N_2$ the same as FIG. 2 C. The total power and effective turns ratio are the same as FIG. 2 C, but primary and secondary voltages are halved.

FIGS. 2A-2D illustrate schematic diagram examples of the transformer module 23 having some configurations. The general form of primary winding can be an mS-nP module with n groups connected in parallel. Each group containing m windings W1 connected in series. The general form of secondary winding can be a jS-kP module with k groups connected in parallel. Each group containing j windings W2 connected in series. For this general configuration, we have m+n=k+j and the turns ratio is $mN_1/jN_2$. $N_1$ is the number of turns of primary winding W1 and $N_2$ is the number of turns of secondary winding W2.

Figures 3A, 3B:
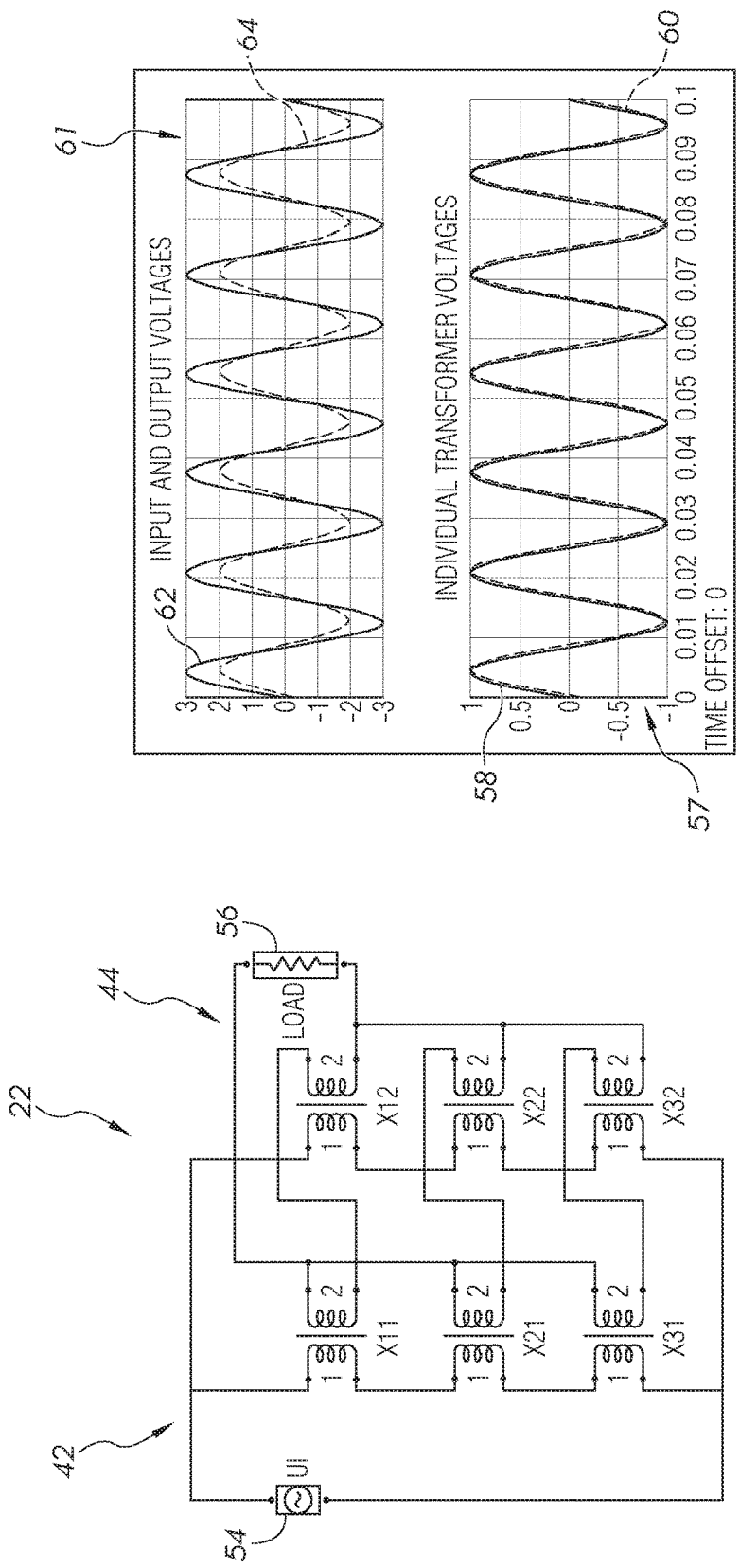
FIG. 3A is a schematic diagram of an exemplary power transformer block having a plurality of transformer modules.
FIG. 3B is a graph of transformer voltages in the embodiment of FIG. 3A.

FIG. 3A is a schematic diagram of one embodiment of FIG. 2B showing a transformer block having a plurality of transformer modules. As seen in FIG. 3A, the primary winding 42 is configured to be operatively connected to a source of power 54 which provides an alternating current. The secondary winding 44 is configured to be operatively connected to a load 56. The effective turns ratio of the module 23 of FIG. 2B is determined as the total number of turns of the primary windings that are in series, divided by the total number of secondary windings in series.

FIG. 3B is a voltage plot of transformer voltages in the embodiment of FIG. 3A. As seen in a bottom graph 57 of FIG. 3B, the individual transformer voltages for each of the transformers X11, X12, X21, X22, X31, and X32 are substantially the same at both the input and the output where an input voltage 58 is substantially the same as an output voltage 60.

In a top graph 61 of FIG. 3B, an input voltage 62 is identified as having a normalized maximum value of +3 and −3. A normalized output voltage 64, however, is identified as having a normalized maximum value of +2 and −2. The effective turns ratio provides the voltage ratio of 3/2, which is confirmed by the maximum values of each of the input voltage 62 and the output voltage 64.

Figure 4:
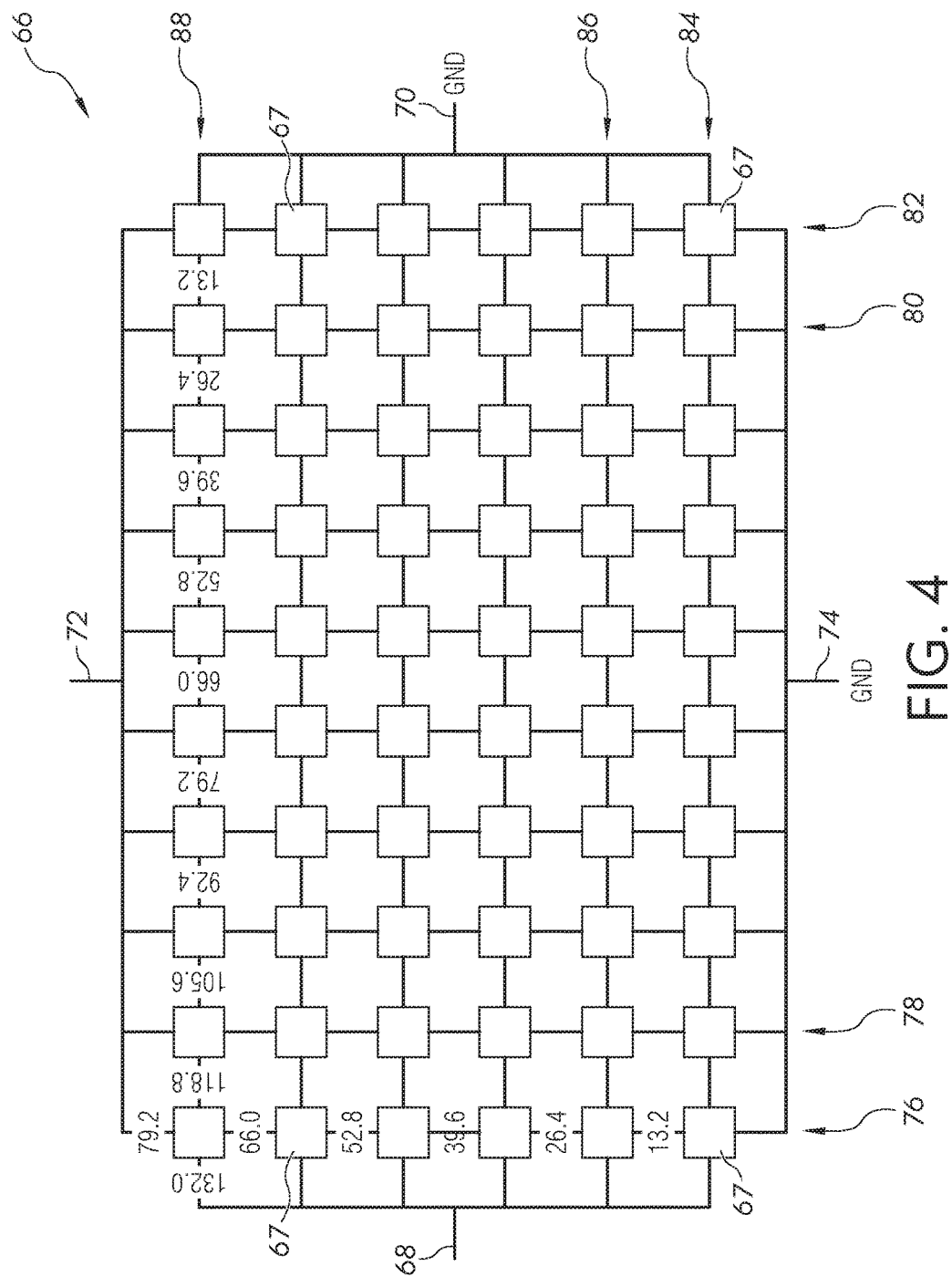
FIG. 4 is a schematic diagram of an exemplary power transformer block including a plurality of transformer modules.

FIG. 4 illustrates one embodiment of a completed power transformer block 66 including a plurality of modules 67. Each of the modules 67 includes input lines coupled to the input windings and output lines coupled to the output windings, as illustrated in FIG. 2. Each of the input lines for the individual modules 67 is operatively connected to an input 68, which carries a single-phase voltage and current signal. The input 68 is the input line for the transformer block 66. For each of the input windings of the modules 67, a ground line 70 is provided. Each of the output lines of each of the modules 67 is operatively connected to an output 72 of the power transformer 66. Each output winding of each individual module 67 is operatively connected to the ground line 74. In another embodiment, each of the illustrated lines includes three wires in parallel with one wire being used for each of the three phases. In other embodiments, other types of phase transformers are used.

The power transformer block 66 is shown as a single-phase transformer including sixty single-phase modules 67, each of which is a one-phase module. In other embodiments, the transformer block is a three-phase transformer including sixty three-phase modules. Other matrix transformers including other phase transformers are contemplated. In the illustrated embodiment, each of the single-phase modules 67 includes a single primary winding having two terminals, which are operatively connected to the input line 68 and to the ground 70. Each of the single-phase modules 67 includes a secondary winding having two terminals, which are operatively connected to the output line 72 and to the ground line 74.

For each of the primary windings of each of the modules 67, the input line 68 is connected to a first terminal of the primary winding of each of the six modules 67 in a first column of modules 76. The other terminal of the primary winding of each of the six modules 67 of column 76 is coupled to a first terminal of the primary winding of a corresponding one of the six modules 67 of a second column 78. This pattern of connection repeats itself from one column of modules to an adjacent column of modules. Once a second to last column of modules 80 is coupled to the last column of modules 82, the second terminals of each of the primary windings of the modules 67 in column 82 are connected together at the ground 70.

For the secondary windings, the same concept applies, except that the secondary windings are coupled in the vertical direction, as illustrated, instead of the horizontal direction. For instance, each of the secondary input windings of each of the modules 67 includes a first terminal and a second terminal. Each of the first terminals of one of the modules in a first row of modules 84 is coupled to the second terminal of an adjacently located module in a second row of modules 86. All of the second terminals of the first row of modules 84 are connected to the ground 74. In the last row of modules 88, each of the first terminals is connected to the output 72.

In one configuration, the embodiment of FIG. 4 is used to implement a wye-wye 230 kV-138 kV (LL) transformer matrix block using 13.2 kV-13.2 kV(ph) modules. The input line 68 receives a 230 kV line voltage, 132 kV phase voltage. At the output line, a 138 kV line voltage, 80 kV phase voltage is provided.

While the embodiment of FIG. 4 is directed to a six rows by ten columns power matrix transformer block illustrated as receiving a predetermined input voltage and providing a predetermined output voltage, the present disclosure is not limited to a six by ten matrix transformer block and other matrix transformer blocks having different combinations of rows and columns are contemplated. In different embodiments, interconnection between modules is achieved by connecting windings in series and/or in parallel.

Figure 5:
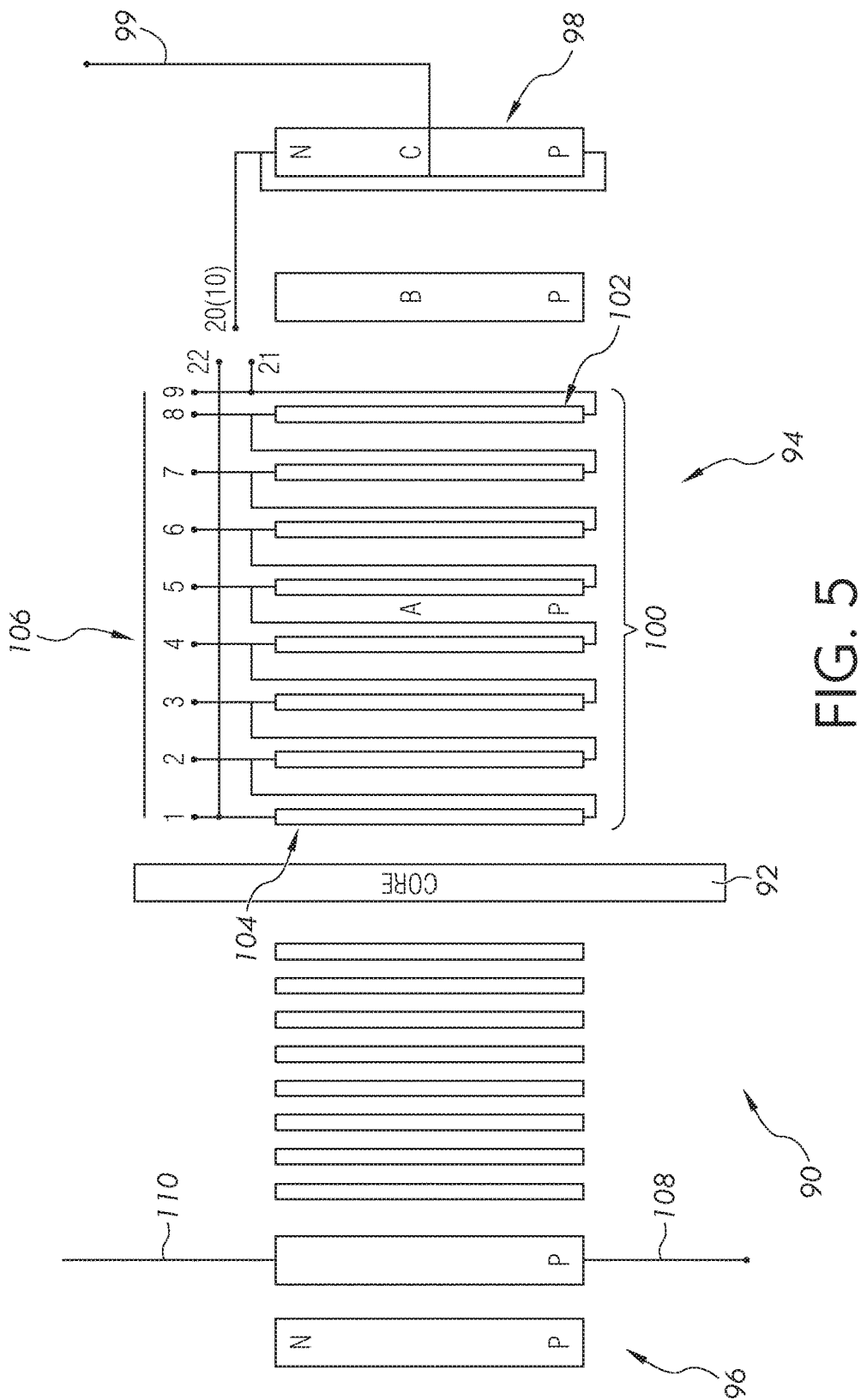
FIG. 5 is a schematic diagram of an exemplary transformer module having a selectable voltage or impedance with a separated regulating winding and low voltage winding top entry and exit on the bottom.

FIG. 5 illustrates one embodiment of an adjustable voltage or impedance transformer module 90 for use in different embodiments of a power matrix transformer having a plurality of transformer modules. The transformer module 90 is configured to include a selectable or adjustable impedance using regulating windings with tap changers, which are adjustable when online or when offline. In one embodiment of a power matrix transformer, for instance, all of the modules, except for one of the modules, are a standardized transformer module such as those illustrated in FIGS. 2A-2D. A standardized module includes a predetermined number of primary windings and secondary windings electrically coupled in a fixed pattern, which is not changeable or adjustable once manufactured. At least one of the modules in power matrix transformer embodiments, including standardized modules, is an adjustable transformer module such as those illustrated in FIGS. 5, 6, and 7. Other types and configurations of adjustable voltage or adjustable impedance transformer modules are contemplated.

The single transformer module 90 of FIG. 5 includes a core 92, a regulating winding A, a low-voltage winding B, and a high-voltage winding C 98. The regulating winding A has a plurality of layers 100, depending on the customer step request, eight layers in this diagram. The entry and exit of the layers connected to taps labeled 1 to 9 give the voltage steps. In addition, the regulating winding A has the first layer 104 connected to the tap 1 and the last layer 102 connected to the tap 21. The low-voltage winding B is a single-layer helical winding but could be a double-layer helical winding, layer winding or disc winding. The high-voltage winding C is a disc winding with center entry 99, and the exit connected to the taps 9 and 20. Using an On-Load Tap Changer (OLTC) and connecting the tap 20 to 21 or 22, Transformer module 90 obtains the maximum, intermediary and minimum voltage positions.

In FIG. 5, P is positive polarity and N is negative polarity of the windings. This single transformer module has two sides: a low-voltage side 96 and a high-voltage side 94. The ground 108 and the output of low voltage 110 are on the low-voltage side 96. The ground 106 and the output of high voltage 99 are on the high-voltage side 94.

Figure 6:
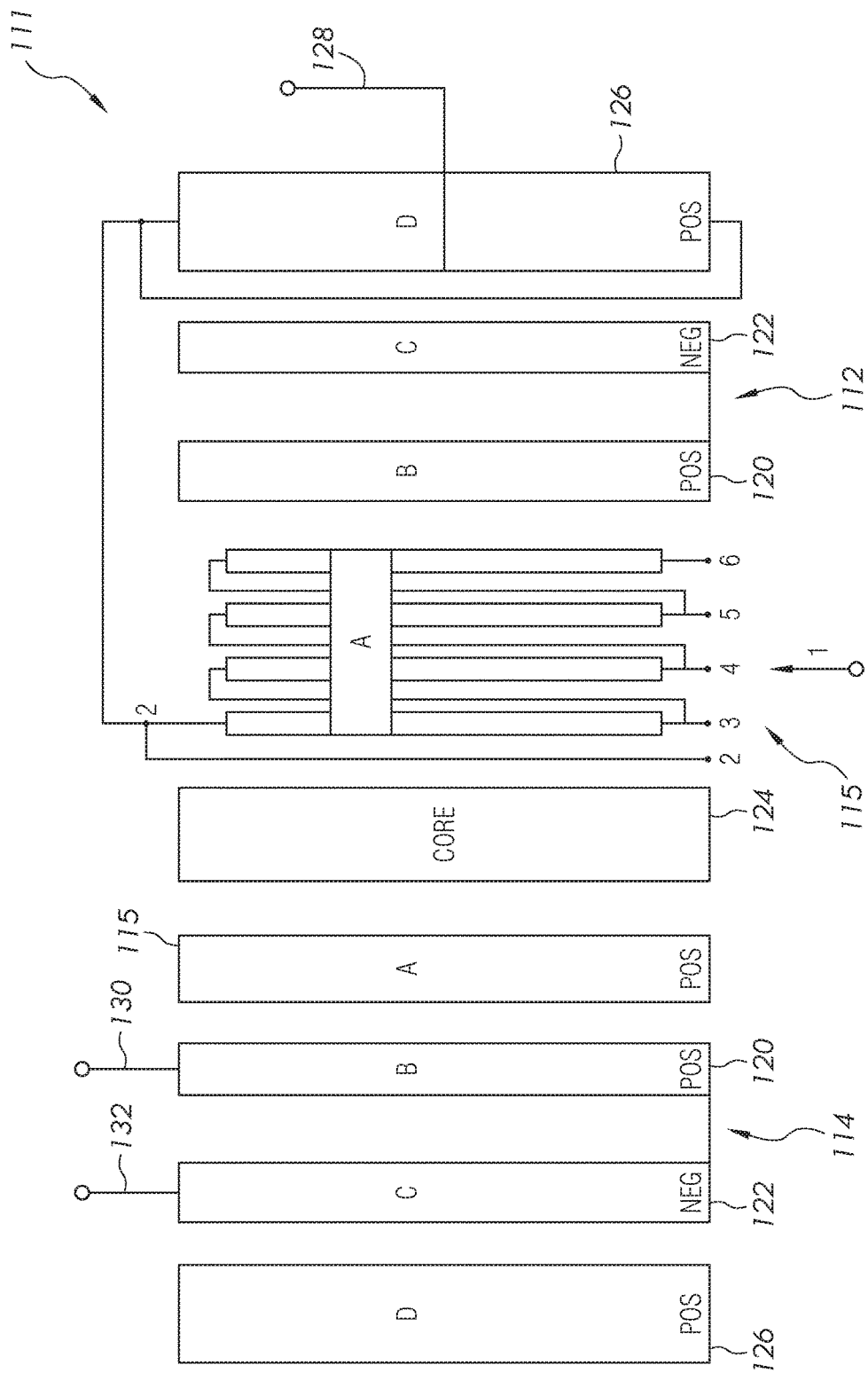
FIG. 6 is a schematic diagram of an exemplary transformer module having a selectable voltage or impedance with a separated regulating winding and low voltage winding entry and exit on the top.

FIG. 6 illustrates another embodiment of an offline adjustable voltage or offline adjustable impedance single transformer module 111 with a separated regulating winding A. Transformer module 111 of FIG. 6 includes a core 124, a regulating winding A 115, a two-layer, low-voltage winding (layer B 120 and layer C 122), and a high-voltage winding D 126. The regulating winding A has a plurality of layers depending on the customer step request, four layers in this diagram. The entry and exit of the layers connected to taps labeled 2 to 6 give minimum, intermediary and maximum high-voltage positions. The low-voltage winding is a double-layer helical winding. The high-voltage winding D is a disc winding with center entry 128, and the exit connected to the beginning of first layer of the regulating winding A and to the tap 2. Using a De-Energized Tap Changer (DETC) and connecting tap 1 to the taps 2 up to 6, transformer module 111 obtains the minimum, intermediary and maximum voltage positions.

In FIG. 6, POS is positive polarity and NEG is negative polarity of the windings. Single transformer module 111 has two sides: low-voltage side 114 and high-voltage side 112. The ground 130 and the low-voltage output 132 are on the low-voltage side 114. The ground connected to the tap 1 and the high-voltage output 128 are on the high-voltage side 112.

FIG. 6 illustrates a double-layer, low-voltage winding 114 having the ground 130 on top and the output 132 on top. The low-voltage winding could also be an axial-split, helical winding with the ground and the output on the top.

Figure 7:
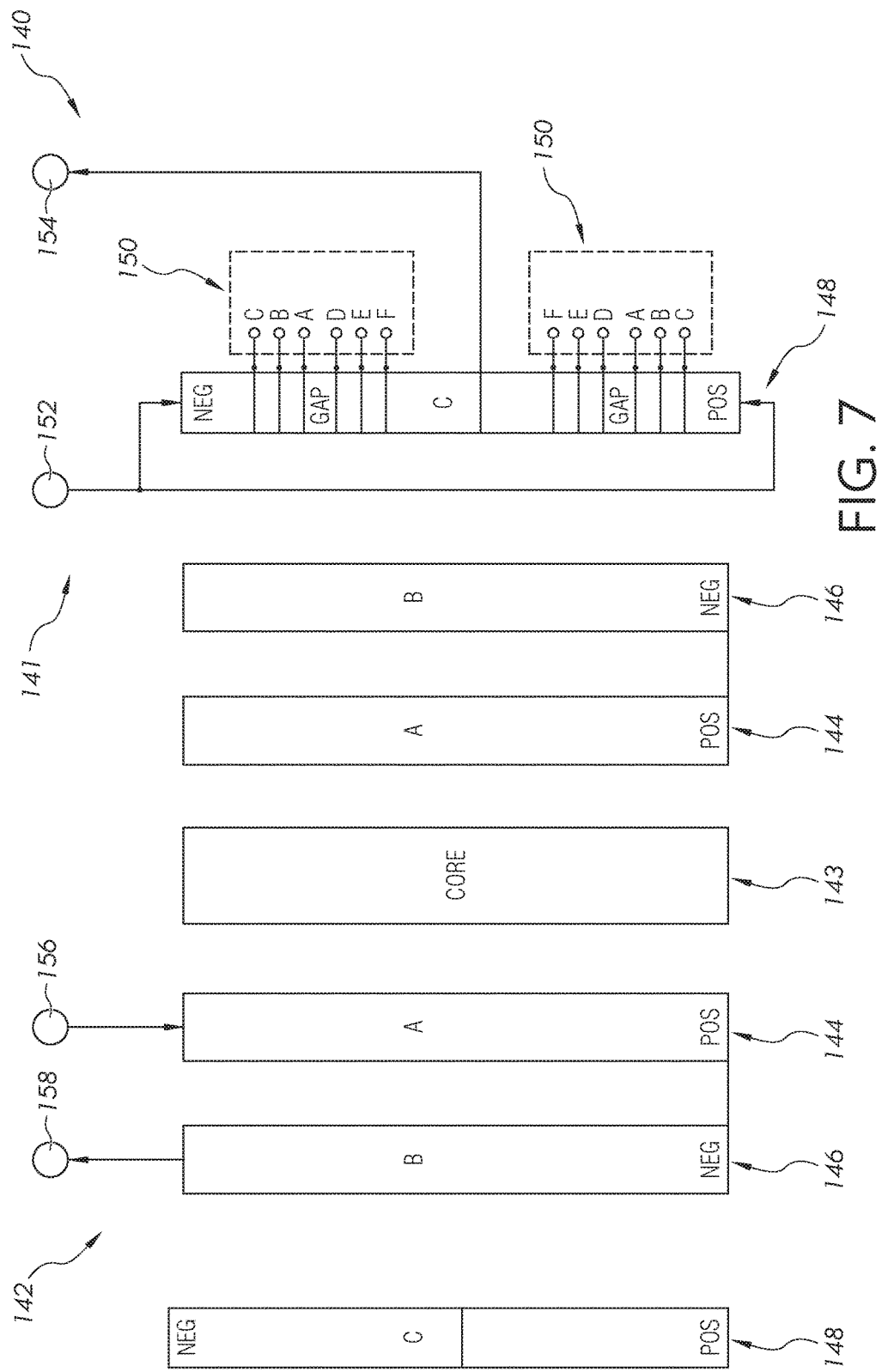
FIG. 7 is a schematic diagram of a transformer module having a selectable voltage or impedance on the same winding.

FIG. 7 illustrates yet another embodiment of an offline adjustable voltage or offline adjustable impedance single transformer module 140 with a regulating winding and a high-voltage winding on the same winding. As seen in FIG. 7, the module 140 includes a core 143, a two-layer, low-voltage winding (layer A 144 and layer B 146), and a high-voltage winding C 148. The high-voltage winding contains a regulating area with the taps 150 connected to one or two DETCs, depending on the high-voltage current. The low-voltage winding is a double-layer, helical winding. The high-voltage winding C 148 is a disc winding with center entry 154 and winding exit 152. Using one or two DETCs, transformer module 140 obtains the maximum, intermediary and minimum voltage positions. In FIG. 7, POS is positive polarity and NEG is negative polarity of the windings. This single transformer module has two sides: low-voltage side 142 and high-voltage side 141. The ground 156 and the low-voltage output 158 are on the low-voltage side 142. The ground 152 and the high-voltage output 154 are on the high-voltage side 141.

In this embodiment, the low-voltage winding is a double-layer winding having the ground 156 on top and the output 158 on top. The low-voltage winding could also be an axial-split, helical winding with the ground and the output on the top. To regulate the high voltage, and depending on the high-voltage current, this embodiment uses one or two DETCs.

FIGS. 5, 6, and 7 show some examples of modules 67. The regulating windings, the low-voltage windings, and the high-voltage windings could be single or multi-windings, layer, helical or disc windings, with top and/or center entry.

In different embodiments of a matrix power transformer, each of the modules (i.e. modules 67) is replaceable with one of the adjustable voltage or impedance modules of FIGS. 5, 6, and 7. At least one of the standardized transformer modules is replaced with a module having the facility for a selectable or an adjustable impedance using regulating windings with a tap changer (either offline or online).

As long as the adjustable voltage or impedance module has "open windings," i.e. the phases are not cross-connected inside the module, the selected location of the adjustable voltage or impedance module is at any location within one of the columns or rows of a matrix transformer. However, in different embodiments, the location of the adjustable voltage or impedance module is determined as a function of physical access to the taps or other connectors of a module in a completed physical matrix transformer. In many embodiments, the location is determined to be physically close to a ground terminal. In those embodiments where the high-voltage winding is the regulated winding, as shown in FIGS. 5, 6, and 7, any one of the modules located in the column 82 is replaceable by one of the adjustable voltage or impedance modules. In different embodiments, one or more of the modules 67 of the column 82 is replaceable by one of the adjustable voltage or impedance modules.

In still another embodiment, the low-voltage winding is the regulated winding of adjustable voltage or impedance modules. In these embodiments, one or more of the modules 67 of the row 84 are replaceable by one of the adjustable voltage or impedance modules. In each of these embodiments, each of the modules in a first row 84 and a last column 82 is replaced with adjustable modules.

Figure 8A:
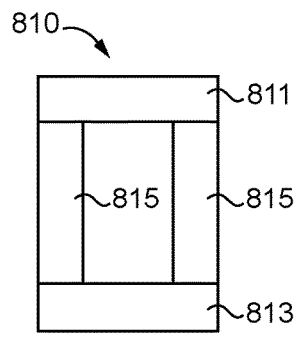
FIGS. 8A-8E are schematic diagrams of exemplary cores included in an exemplary transformer module.
Figure 8B:
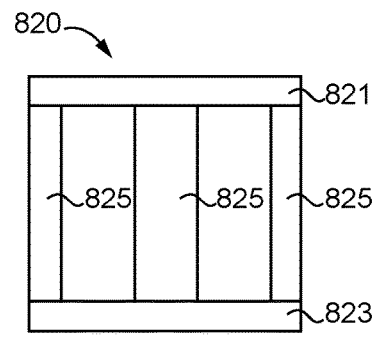
Figure 8C:
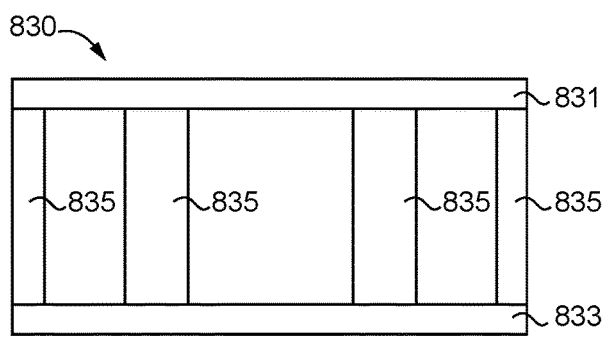

With reference to FIGS. 8A-8C, there is illustrated a plurality of possible transformer cores included in exemplary single phase transformer modules. Each core may be structured as a stacked core or a wound core. As illustrated, a transformer core may be a core type or a shell type configuration. FIG. 8A illustrates a D core 810 including an upper yoke 811, a lower yoke 813, and two limbs 815. FIG. 8B illustrates an EY core 820 including and upper yoke 821, a lower yoke 823, and three limbs 825. FIG. 8C illustrates a DY core 830 including an upper yolk 831, a lower yolk 833, and four limbs 835.

Figure 8D:
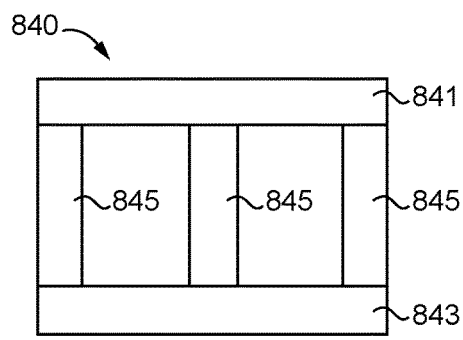
Figure 8E:
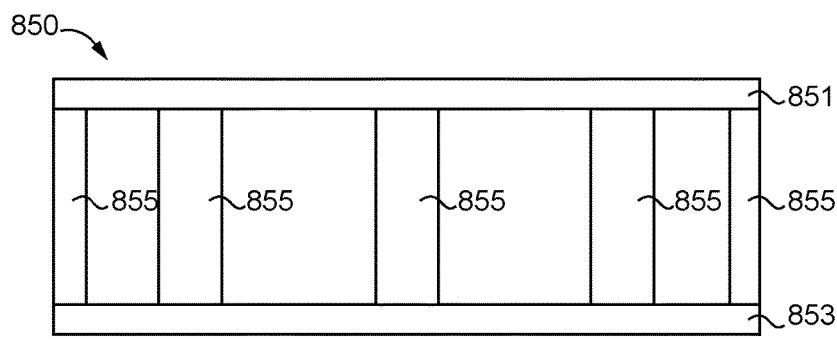

With reference to FIGS. 8D-8E, there is illustrated a plurality of cores incorporated into exemplary three-phase transformer modules. FIG. 8D illustrates a T core 840 including an upper yolk 841, a lower yolk 843, and three limbs 845. FIG. 8E illustrates a TY core 850 including an upper yolk 851, a lower yolk 853, and five limbs 855.

With reference to FIGS. 9A-14B, transformer modules are referred to as X/Y transformer modules, where X is the number of primary windings and Y is the number of secondary windings of the transformer module. As illustrated, high voltage (HV) windings are primary windings and low voltage (LV) windings are secondary windings. In other embodiments, HV windings may be secondary windings and LV windings may be primary windings. Primary windings of each transformer module are structured to be coupled together in parallel, in series, or in a combination of parallel and series connections. Secondary windings of each transfer module are also structured to be coupled together in parallel, in series, or a combination of parallel and series connections.

Figure 9A:
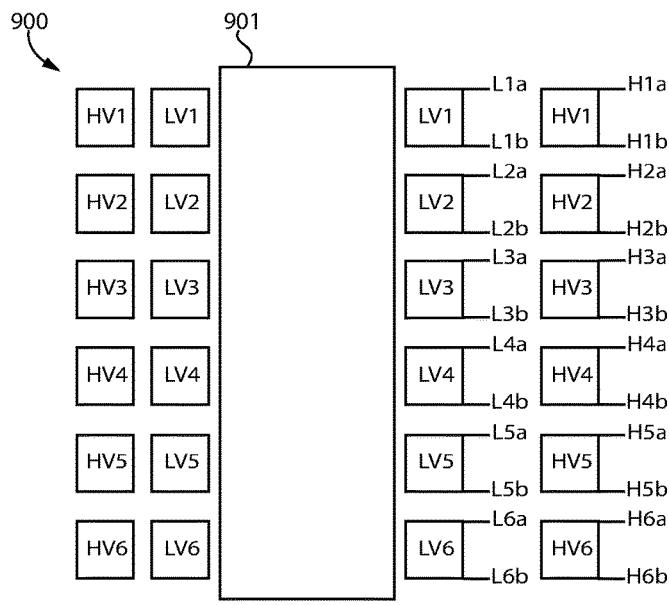
FIGS. 9A-9C are schematic diagrams of an exemplary six winding transformer modules.

With reference to FIG. 9A, there is illustrated an exemplary 6/6 transformer module 900 including a common core 901, six HV windings HV1-HV6 and six LV windings LV1-LV6. Each winding includes two winding output terminals: HV winding HV1 includes output terminals H1a and H1b, HV winding HV2 includes output terminals H2a and H2b, HV winding HV3 includes output terminals H3a and H3b, HV winding HV4 includes output terminals H4a and H4b, HV winding HV5 includes output terminals H5a and H5b, HV winding HV6 includes output terminals H6a and H6b, LV winding LV1 includes output terminals L1a and L1b, LV winding LV2 includes output terminals L2a and L2b, LV winding LV3 includes output terminals L3a and L3b, LV winding LV4 includes output terminals L4a and L4b, LV winding LV5 includes output terminals L5a and L5b, and LV winding LV6 includes output terminals L6a and L6b.

In certain embodiments, one terminal of a winding is coupled to the first end of the winding and the second terminal of the winding is coupled to the second end of the winding. In certain embodiments, one terminal of a winding is coupled to the center of the winding and the second terminal is coupled to both ends of the winding.

In certain embodiments, HV windings HV1-HV6 are structured such that the voltage ratio of HV windings HV1-HV6 is 1:1:1:1:1:1. A voltage ratio is the ratio of the voltage across each winding for a set of LV windings or HV windings. The voltage ratio is proportional to the number of winding turns ratio for the set of LV windings or HV windings. For example, where transformer module 900 is receiving AC power including a voltage of 138 kV at the HV windings and the HV windings are coupled in series, the voltage across each HV winding is 23 kV, since the turns ratio and voltage ratio for the HV windings is 1:1:1:1:1:1. Similarly, LV windings LV1-LV6 are structured such that the voltage ratio of LV windings LV1-LV6 is 1:1:1:1:1:1. In certain embodiments, the effective voltage ratio of the series coupled HV windings to the series coupled LV windings may be other than 1:1. It shall be appreciated that any or all of the foregoing features of transformer module 900 may also be present in the other transformer modules disclosed herein.

Figures 9B, 9C:
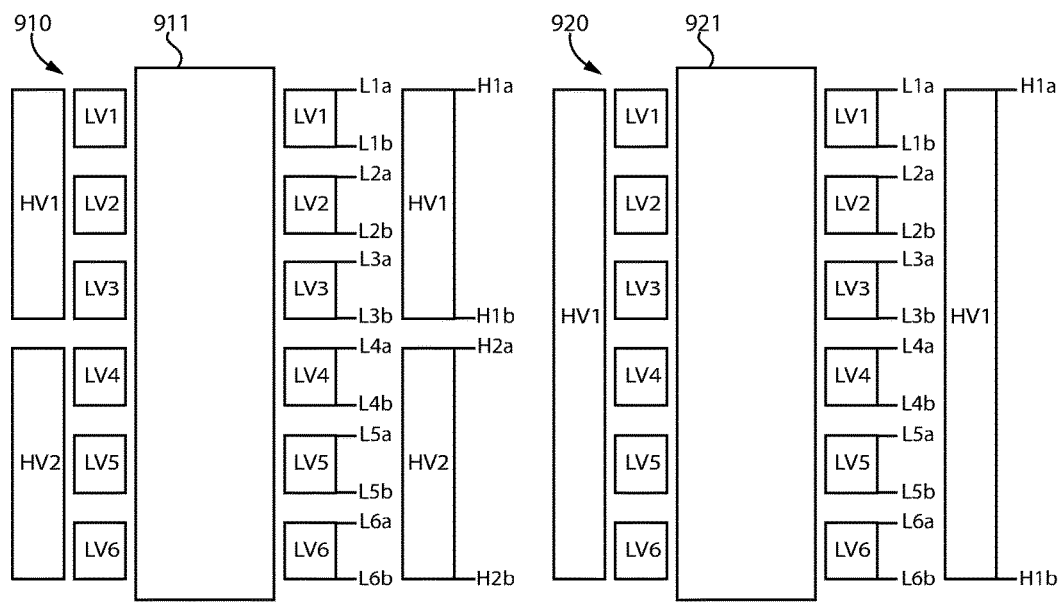

With reference to FIG. 9B, there is illustrated an exemplary 2/6 transformer module 910 including a common core 911, two HV windings HV1-HV2, and six LV windings LV1-LV6. Each winding includes two winding output terminals: HV winding HV1 includes output terminals H1a and H1b, HV winding HV2 includes output terminals H2a and H2b, LV winding LV1 includes output terminals L1a and L1b, LV winding LV2 includes output terminals L2a and L2b, LV winding LV3 includes output terminals L3a and L3b, LV winding LV4 includes output terminals L4a and L4b, LV winding LV5 includes output terminals L5a and L5b, and LV winding LV6 includes output terminals L6a and L6b.

In certain embodiments, HV windings HV1-HV2 are structured such that the voltage ratio of HV windings HV1-HV2 is 1:1 and LV windings LV1-LV6 are structured such that the voltage ratio of LV windings LV1-LV6 is 1:1:1:1:1:1. Furthermore, the voltage ratio of the HV windings coupled in series and the LV windings coupled in series is 1:1. For example, where series coupled HV windings HV1 and HV2 receive AC power including a voltage 138 kV, the voltage across each HV winding is 69 kV and the voltage across each series coupled LV winding is 23 kV.

With reference to FIG. 9C, there is illustrated an exemplary 1/6 transformer module 920 including a common core 921, one HV winding HV1, and six LV windings LV1-LV6. Each winding includes two winding output terminals: HV winding HV1 includes output terminals H1a and H1b, LV winding LV1 includes output terminals L1a and L1b, LV winding LV2 includes output terminals L2a and L2b, LV winding LV3 includes output terminals L3a and L3b, LV winding LV4 includes output terminals L4a and L4b, LV winding LV5 includes output terminals L5a and L5b, and LV winding LV6 includes output terminals L6a and L6b.

In certain embodiments, LV windings LV1-LV6 are structured such that the voltage ratio of LV windings LV1-LV6 is 1:1:1:1:1:1 and the voltage ratio of HV winding HV1 and the LV windings coupled in series is 1:1. For example, where HV winding HV1 receives AC power with a voltage of 138 kV, the voltage across each LV winding is 23 kV.

Figures 10A, 10B:
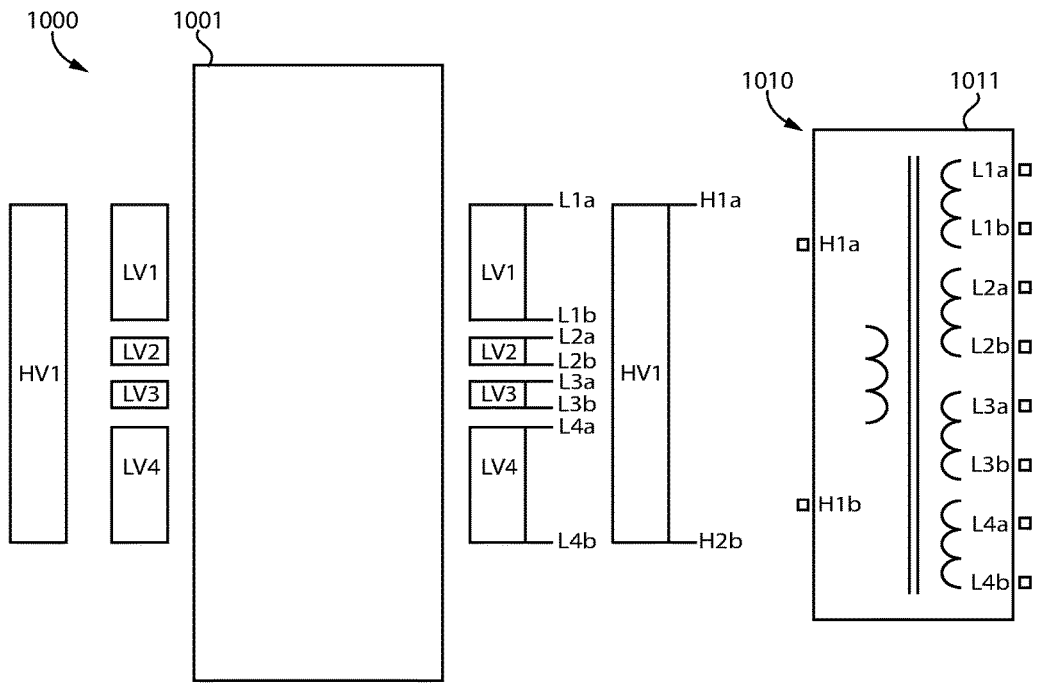
FIG. 10A is a schematic diagram of an exemplary 1/4 transformer module.
FIG. 10B is an equivalent circuit of the transformer module of FIG. 10A.

With reference to FIG. 10A, there is illustrated an exemplary 1/4 transformer module 1000 including a common core 1001, one HV winding HV1, and four LV windings LV1-LV4. Each winding includes two winding output terminals: HV winding HV1 includes output terminals H1a and H1b, LV winding LV1 includes output terminals L1a and L1b, LV winding LV2 includes output terminals L2a and L2b, LV winding LV3 includes output terminals L3a and L3b, and LV winding LV4 includes output terminals L4a and L4b.

LV windings LV1-LV4 are structured such that the voltage ratio of LV windings LV1-LV4 is 5:1:1:5 and HV winding HV1 is be structured such that the voltage ratio of HV1 to the LV windings coupled in series is 5:3. For example, where HV winding HV1 receives AC power with a voltage of 138 kV, the voltage across LV winding LV1 is 57.5 kV, the voltage across LV winding LV2 is 11.5 kV, the voltage across LV winding LV3 is 11.5 kV, and the voltage across LV winding LV4 is 57.5 kV.

With reference to FIG. 10B, there is an equivalent circuit 1010 illustrating a 1/4 transformer module, such as transformer module 1000 in FIG. 10A. Circuit 1010 includes LV winding output terminals L1a-b, L2a-b, L3a-b, L4a-b, and HV winding output terminals H1a-b and H2a-b.

Figures 11A, 11B:
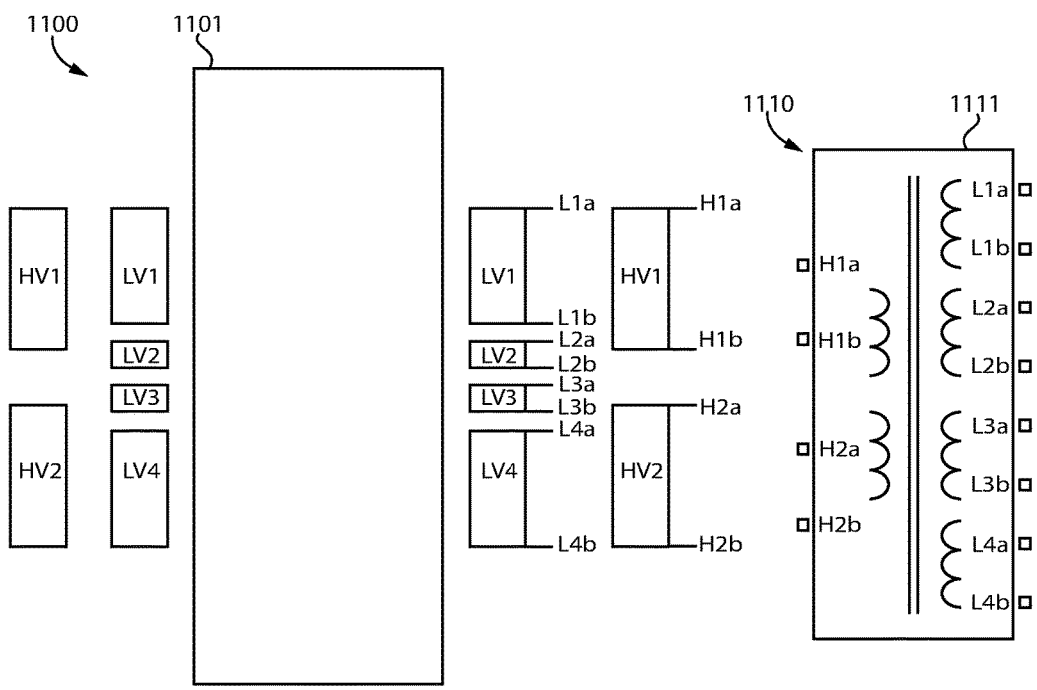
FIG. 11A is a schematic diagram of an exemplary 2/4 transformer module.
FIG. 11B is an equivalent circuit of the 2/4 transformer module in FIG. 11A.

With reference to FIG. 11A, there is illustrated an exemplary 2/4 transformer module 1100 including a common core 1101, two HV windings HV1-HV2, and four LV windings LV1-LV4. Each winding includes two winding output terminals: HV winding HV1 includes output terminals H1a and H1b, HV winding HV2 includes output terminals H2a and H2b, LV winding LV1 includes output terminals L1a and L1b, LV winding LV2 includes output terminals L2a and L2b, LV winding LV3 includes output terminals L3a and L3b, and LV winding LV4 includes output terminals L4a and L4b.

LV windings LV1-LV4 are structured such that the voltage ratio of LV windings LV1-LV4 is 5:1:1:5 and HV windings HV1-HV2 are structured such that the voltage ratio of HV1 to HV2 is 1:1. The voltage ratio of the HV windings coupled in series to the LV windings coupled in series is 1:1. For example, where the HV windings receive AC power with a voltage of 138 kV, the voltage across HV1 is 69 kV, the voltage across HV2 is 69 kV, the voltage across LV winding LV1 is 57.5 kV, the voltage across LV winding LV2 is 11.5 kV, the voltage across LV winding LV3 is 11.5 kV, and the voltage across LV winding LV4 is 57.5 kV.

With reference to FIG. 11B, there is an equivalent circuit 1110 illustrating a 2/4 transformer module, such as transformer module 1100 in FIG. 11A. Circuit 1110 includes LV winding output terminals L1a-b, L2a-b, L3a-b, L4a-b, and HV winding output terminals H1a-b and H2a-b.

Figures 12A, 12B:
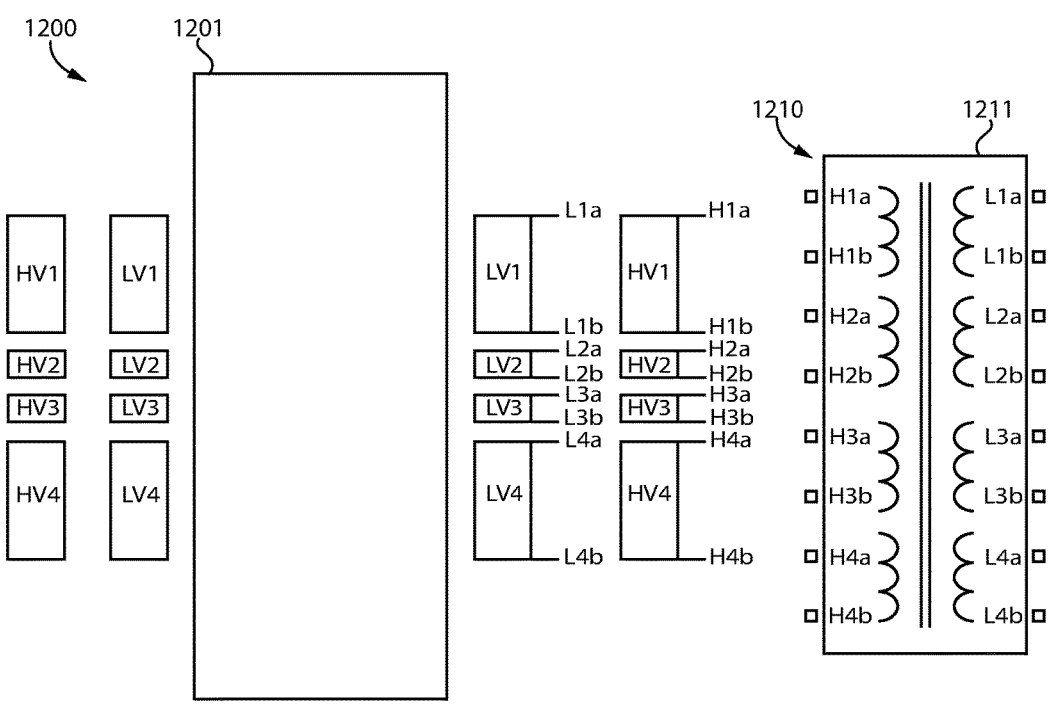
FIG. 12A is a schematic diagram of an exemplary 4/4 transformer module.
FIG. 12B is an equivalent circuit of the 4/4 transformer module in FIG. 12A.

With reference to FIG. 12A, there is illustrated an exemplary 4/4 transformer module 1200 including a common core 1201, four HV windings HV1-HV4, and four LV windings LV1-LV4. Each winding includes two winding output terminals: HV winding HV1 includes output terminals H1a and H1b, HV winding HV2 includes output terminals H2a and H2b, HV winding HV3 includes output terminals H3a and H3b, HV winding HV4 includes output terminals H4a and H4b, LV winding LV1 includes output terminals L1a and L1b, LV winding LV2 includes output terminals L2a and L2b, LV winding LV3 includes output terminals L3a and L3b, and LV winding LV4 includes output terminals L4a and L4b.

LV windings LV1-LV4 are structured such that the voltage ratio of LV windings LV1-LV4 is 5:1:1:5 and HV windings HV1-HV4 are structured such that the voltage ratio of HV1-HV4 is 5:1:1:5. The voltage ratio of the HV coupled in series to the LV windings coupled in series is 1:1. For example, where the HV windings receives AC power with a voltage of 138 kV, the voltage across HV winding HV1 is 57.5 kV, the voltage across HV winding HV2 is 11.5 kV, the voltage across HV winding HV3 is 11.5 kV, and the voltage across HV winding HV4 is 57.5 kV; the voltage across LV winding LV1 is 57.5 kV, the voltage across LV winding LV2 is 11.5 kV, the voltage across LV winding LV3 is 11.5 kV, and the voltage across LV winding LV4 is 57.5 kV.

With reference to FIG. 12B there is an equivalent circuit 1210 illustrating a 4/4 transformer module, such as transformer module 1200 in FIG. 12A. Circuit 1210 includes LV winding output terminals L1a-b, L2a-b, L3a-b, L4a-b, and HV winding output terminals H1a-b, H2a-b, H3a-b, and H4a-b.

Figure 13:
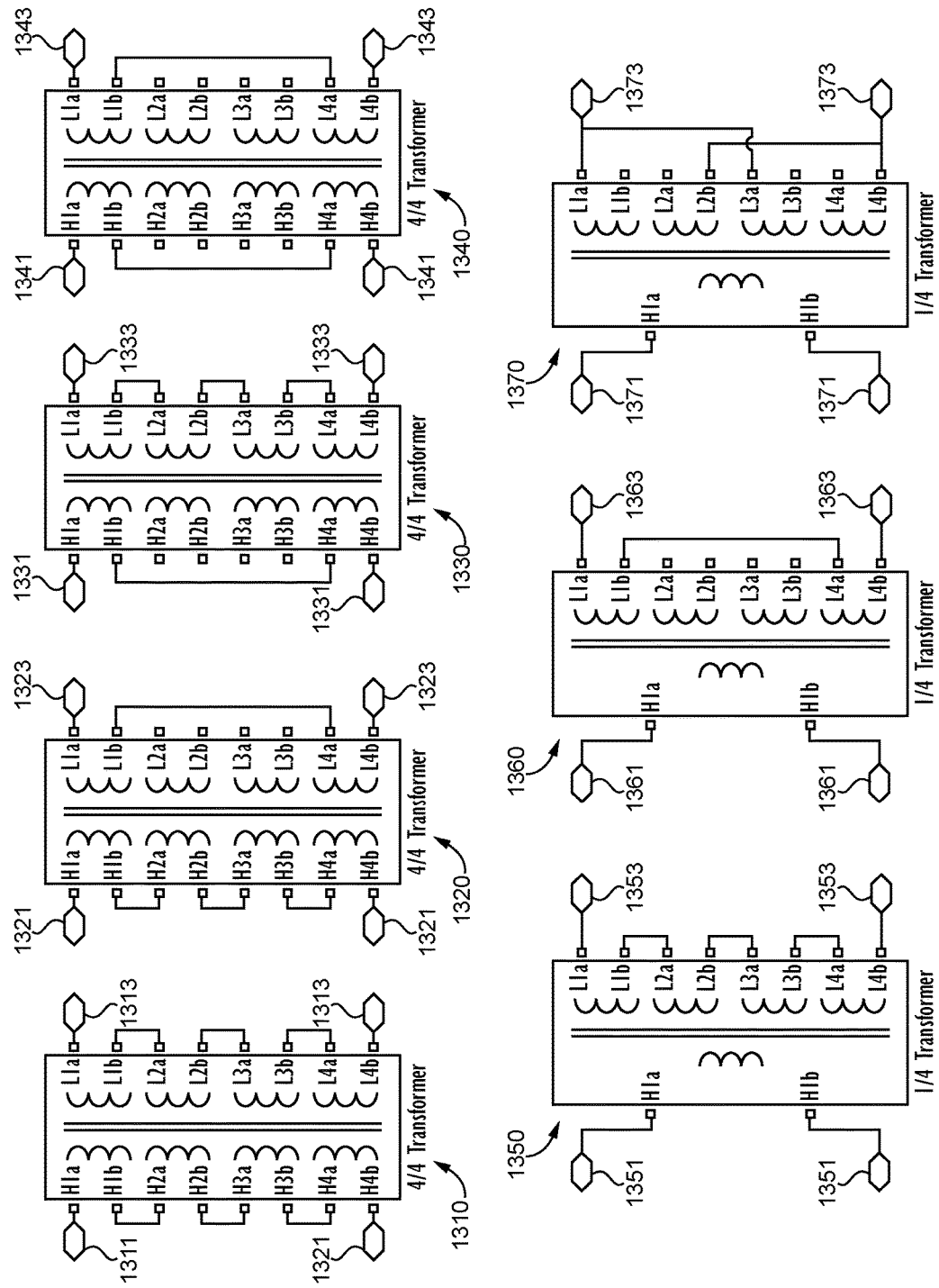
FIG. 13 is a plurality of equivalent circuits of exemplary transformer modules having various connections between the high voltage windings and various connection between the low voltage windings.

With reference to FIG. 13, there are transformer module equivalent circuits 1310, 1320, 1330, 1340, 1350, 1360, and 1370. Circuits 1310, 1320, 1330, and 1340 demonstrate different connections between HV windings and LV windings of transformer module 1200 in FIG. 12A. Circuits 1350, 1360, and 1370 demonstrate different connections between the HV windings and LV windings of 1/4 transformer module 1000 in FIG. 10A.

Circuit 1310 illustrates 4/4 transformer module 1200 where all four HV windings are coupled in series between input terminals 1311, and where all LV windings are coupled in series between output terminals 1313. Since the effective voltage ratio of HV windings to LV windings is 1:1, the voltage of the AC power received by the transformer module at input terminals 1311 is the same as the voltage of the AC power output at output terminals 1313.

Circuit 1320 illustrates 4/4 transformer module 1200 where all four HV windings are coupled in series between input terminals 1321, and where LV windings LV1 and LV4 are coupled in series between output terminals 1323. Since the effective voltage ratio of HV windings to LV windings is 6:5, an input voltage of 138 kV would be stepped down to 115 kV.

Circuit 1330 illustrates 4/4 transformer module 1200 where HV windings HV1 and HV4 are coupled in series between input terminals 1331, and where all four LV windings are coupled in series between output terminals 1313. Since the effective voltage ratio of HV windings to LV windings is 5:6, an input voltage of 115 kV would be stepped up to 138 kV.

Circuit 1340 illustrates 4/4 transformer module 1200 where HV windings HV1 and HV4 are coupled in series between input terminals 1341, and where LV windings LV1 and LV 4 are coupled in series between output terminals 1343. Since the effective voltage ratio of HV windings to LV windings is 1:1, the output voltage across output terminals 1343 is equal to the input voltage across input terminals 1311.

Circuit 1350 illustrates 1/4 transformer module 1000 where HV winding HV1 is coupled to input terminals 1351 and all four LV windings are coupled in series. Since the effective voltage ratio of HV windings to LV windings is 5:3, an input voltage of 230 kV would be stepped down to 138 kV.

Circuit 1360 illustrates 1/4 transformer module 1000 where HV winding HV1 is coupled to input terminals 1351 and LV windings LV1 and LV4 are coupled in series. Since the effective voltage ratio of HV windings to LV windings is 2:1, an input voltage of 230 kV would be stepped down to 115 kV.

Circuit 1370 illustrates 1/4 transformer module 1000 where HV winding HV1 is coupled to input terminals 1351, LV windings LV1 and LV2 are coupled in series and coupled in parallel to series coupled LV3 and LV4. Since the effective voltage ratio of HV windings to LV windings is 10:3, an input voltage of 230 kV would be stepped down to 69 kV.

Figure 14A:
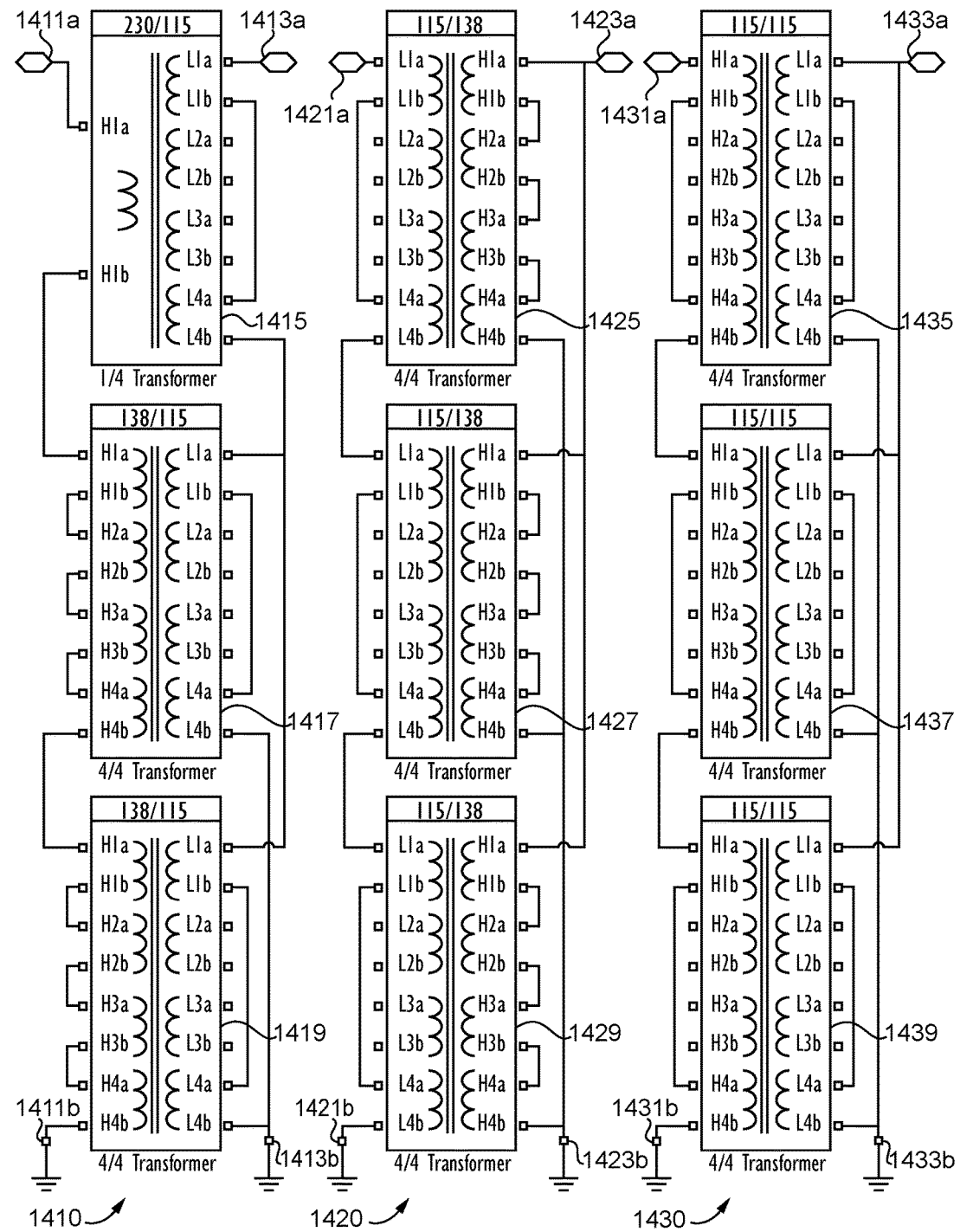
FIGS. 14A and 14B are a plurality of equivalent circuits of exemplary blocks comprised of exemplary 1/4 and 4/4 transformer modules.
Figure 14B:
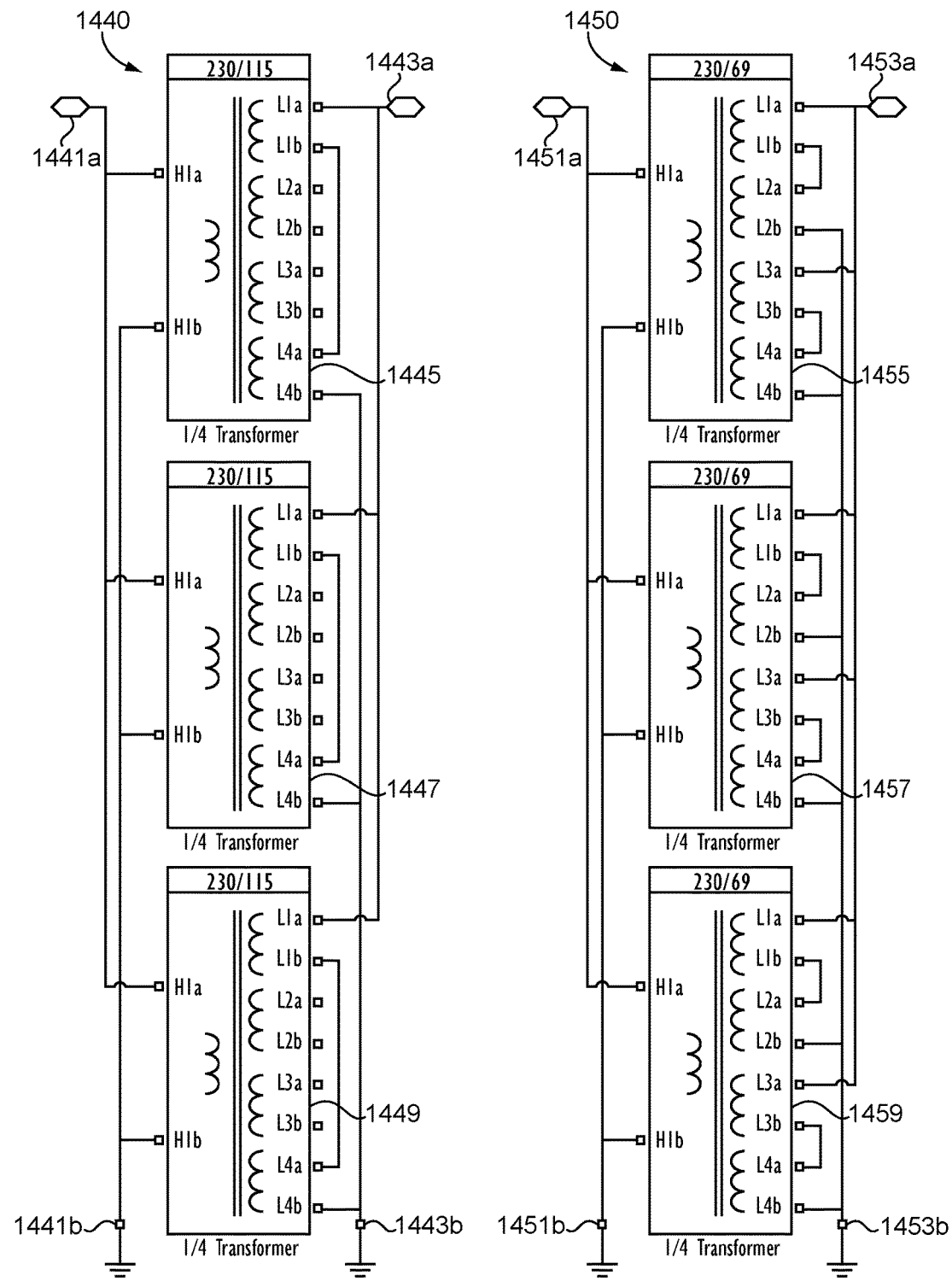

With reference to FIGS. 14A and 14B, there is illustrated exemplary portions of transformer blocks 1410, 1420, 1430, 1440, and 1450 comprising combinations of 1/4 transformer module 1000 of FIG. 10A and 4/4 transformer module 1200 of FIG. 12A. It is important to note that in each block configuration of the standardized transformer blocks, the transformer modules may be arranged such that no less than 83.3% of the windings in each transformer module are unused, reducing the unnecessary cost and constructions materials.

Transformer block 1410 includes one 1/4 transformer module 1415 and two 4/4 transformer modules 1417. All HV windings from each module are coupled in series between input terminals 1411a and 1411b. LV windings LV1 and LV4 of each module are coupled in series, and the LV windings of module 1415 are coupled in series with the parallel coupled LV windings of modules 1417 and 1419 between output terminals 1413a and 1413b. Since the effective voltage ratio of HV windings to LV windings is 11:5, an input voltage of 500 kV would be stepped down to approximately 230 kV.

Transformer block 1420 includes three 4/4 transformer modules 1425, 1427, and 1429. LV windings LV1 and LV4 of each module are coupled in series and the LV windings of each module are coupled together in series between 1421a and 1421b. All HV windings of each module are coupled in series and the HV modules from each module are coupled in parallel between output terminals 1423a and 1423b. Since the effective voltage ratio of LV windings to HV windings is 5:2, an input voltage of 345 kV would be stepped down to 138 kV.

Transformer block 1430 includes three 4/4 transformer modules 1435, 1437, and 1439. HV windings HV1 and HV4 of each module are coupled in series and the HV windings of each module are coupled together in series between 1421a and 1421b. LV windings LV1 and LV4 of each module are coupled in series and the LV windings from each module are coupled in parallel between output terminals 1433a and 1433b. Since the effective voltage ratio of HV windings to LV windings is 3:1, an input voltage of 345 kV would be stepped down to 115 kV.

Transformer block 1440 includes three 1/4 transformer modules 1445, 1447, and 1449. The HV windings of modules 1445, 1447, and 1449 are coupled in parallel across input windings 1441a and 1441b. LV windings LV1 and LV4 of each module are coupled together in series, and the LV windings of each module are coupled in parallel across output terminals 1443a and 1443b. Since the effective voltage ratio of HV windings to LV windings is 2:1, an input voltage of 230 kV would be stepped down to 115 kV.

Transformer block 1450 includes three 1/4 transformer modules 1455, 1457, and 1459. The HV windings of modules 1455, 1457, and 1459 are coupled in parallel across input windings 1451a and 1451b. LV windings LV1 and LV2 of each module are coupled together in series and LV windings LV3 and LV4 of each module are coupled together in series, and in parallel with LV windings LV1 and LV2, the LV windings of each module are coupled in parallel with the LV windings of the other modules across output terminals 1453a and 1453b. Since the effective voltage ratio of HV windings to LV windings is 10:3, an input voltage of 230 kV would be stepped down to 69 kV.

Further written descriptions of a number of exemplary embodiments shall now be provided. One embodiment is a matrix power transformer system comprising: one or more transformer blocks, wherein: each transformer block includes a plurality of transformer module assemblies; each of the transformer module assemblies includes a primary winding and a secondary winding; the primary windings of each of the transformer module assemblies are coupled to the primary windings of another of the plurality of transformer module assemblies; the secondary windings of each of the transformer module assemblies are coupled to the secondary windings of another of the first plurality of transformer module assemblies; at least one of the plurality of transformer module assemblies includes a selectable or adjustable impedance using regulating windings with tap changers, which are adjustable when online or when offline.

Another exemplary embodiment is a matrix power transformer system comprising: a first transformer block including a first plurality of transformer module assemblies, wherein each of the first transformer module assemblies includes a primary winding having an input and an output and a secondary winding having an input and an output; and a second transformer block including a second plurality of transformer module assemblies, wherein at least one of the second plurality of module assemblies includes a selectable or adjustable impedance using regulating windings with tap changers, which are adjustable when online or when offline.

A further exemplary embodiment is a matrix power transformer system comprising: a plurality of block assemblies each including a plurality of transformer modules, each transformer module including a primary winding coupled to an input and a secondary winding coupled to an output, the inputs of each transformer module in one block assembly being coupled together and the outputs of each transformer block being coupled together, wherein one of the secondary windings includes a plurality of taps structured to be selectively coupled to the output of the associated transformer module assembly or another secondary winding of the associated module assembly.

In certain forms of the foregoing matrix power transformer system each block assembly is structured to weigh less than 40 tons, and wherein the matrix power transformer system has a power rating greater than 100 megavolt-amperes (MVA). In certain forms, each transformer module includes a plurality of primary windings coupled in series or in parallel, and wherein each transformer module includes a plurality of second windings coupled in series or in parallel. In certain forms, each input includes two input terminals, each input terminal being coupled to at least one terminal of another transformer module assembly, and wherein each output includes two output terminals, each output terminal being coupled to at least one terminal of another transformer module assembly. In certain forms, the plurality of transformer module assemblies includes a first set of transformer module assemblies with inputs coupled in series and a second set of transformer module assemblies with inputs coupled in series, and wherein the first set of transformer module assemblies and the second set of transformer module assemblies are coupled in parallel. In certain forms, each block assembly is structured to be enclosed by a tank. In certain forms, the tank is structured to fit within an enclosure measuring 40 feet by eight feet by eight feet, six inches.

A further exemplary embodiment is a modular power transformer having a power rating greater than 100 MVA comprising: a plurality of transformer blocks each including: an enclosure, a first set of block terminals, a second set of block terminals, and a plurality of transformer modules located within the enclosure, each module including: a first set of module terminals, a second set of module terminals, at least one primary winding coupled to the first set of module terminals, at least one secondary winding coupled to the second set of module terminals, and a transformer core, wherein the primary windings of the transformer modules in one transformer block are coupled together between the first set of block terminals and the secondary windings of the transformer modules in the same transformer block are coupled together between the second set of block terminals.

In certain forms of the foregoing modular power transformer, each transformer block weighs less than or equal to 40 tons. In certain forms, the primary windings of the transformer modules in one transformer block are coupled together in parallel, in series, or a combination thereof. In certain forms of the foregoing, at least one of the transformer modules includes the first primary winding, a second primary winding, a third primary winding, a fourth primary winding, the first secondary winding, a second secondary winding, a third secondary winding, and a fourth secondary winding, wherein the voltage ratio of the first primary winding to the second primary winding to the third primary winding to the fourth primary winding is 5:1:1:5, and wherein the voltage ratio of the first secondary winding to the second secondary winding to the third secondary winding to the fourth secondary winding is 5:1:1:5. In certain forms, at least one of the transformer modules includes the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1. In certain forms, at least one of the transformer modules includes the first primary winding, a second primary winding, a third primary winding, a fourth primary winding, and the secondary winding, wherein the voltage ratio of the first primary winding to the second primary winding to the third primary winding to the fourth primary winding is 5:1:1:5. In certain forms, at least one of the transformer modules includes the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1. In certain forms, at least one of the transformer modules includes the first primary winding, a second primary winding, a third primary winding, a fourth primary winding, a fifth primary winding, a sixth primary winding, the first secondary winding, and a second secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding is 1:1. In certain forms, at least one of the transformer modules includes the first primary winding, a second primary winding, a third primary winding, a fourth primary winding, a fifth primary winding, a sixth primary winding, and the first secondary winding, wherein the voltage ratio of the first primary winding to the second primary winding to the third primary winding to the fourth primary winding to the fifth primary winding to the sixth primary winding is 1:1:1:1:1:1. In certain forms, one or more of the plurality of blocks includes a flexible impedance or flexible voltage module.

A further exemplary embodiment is a method for assembling a modular power transformer comprising: selecting a plurality of transformer modules from a set of standardized transformer modules, each standardized transformer module including a primary winding, a secondary winding, and a core; assembling a plurality of transformer blocks by coupling sets of the selected plurality of transformer modules, the weight of each transformer block being equal to or less than 40 tons; separately transporting each transformer block to a remote location; and coupling each of the transformer blocks together at the remote location between an AC power source and a load.

In certain forms of the foregoing method, the set of standardized transformer modules includes a first standardized transformer module including the first primary winding, a second primary winding, a third primary winding, a fourth primary winding, the first secondary winding, a second secondary winding, a third secondary winding, and a fourth secondary winding, wherein the voltage ratio of the first primary winding to the second primary winding to the third primary winding to the fourth primary winding is 5:1:1:5, and wherein the voltage ratio of the first secondary winding to the second secondary winding to the third secondary winding to the fourth secondary winding is 5:1:1:5. in certain forms, the set of standardized transformer modules includes a second standardized transformer module including the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1. In certain forms, the set of standardized transformer modules includes a second standardized transformer module including the first primary winding, a second primary winding, a third primary winding, a fourth primary winding, and the secondary winding, wherein the voltage ratio of the first primary winding to the second primary winding to the third primary winding to the fourth primary winding is 5:1:1:5. In certain forms, the set of standardized transformer modules includes a first standardized transformer module including the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1. In certain forms, the set of standardized transformer modules includes a second standardized transformer module including the first primary winding, a second primary winding, a third primary winding, a fourth primary winding, a fifth primary winding, a sixth primary winding, the first secondary winding, and a second secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding is 1:1. In certain forms, the set of standardized transformer modules includes a second standardized transformer module including the first primary winding, a second primary winding, a third primary winding, a fourth primary winding, a fifth primary winding, a sixth primary winding, and the first secondary winding, wherein the voltage ratio of the first primary winding to the second primary winding to the third primary winding to the fourth primary winding to the fifth primary winding to the sixth primary winding is 1:1:1:1:1:1.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A matrix power transformer system comprising:
   a plurality of block assemblies each including a plurality of transformer modules, each transformer module including a primary winding coupled to an input and a secondary winding coupled to an output, the inputs of each transformer module in one block assembly being coupled together and the outputs of each transformer block being coupled together,
   wherein one of the secondary windings includes a plurality of taps structured to be selectively coupled to the output of the associated transformer module or another secondary winding of the associated transformer module,
   wherein each block assembly is structured to weigh less than 40tons, and
   wherein the matrix power transformer system has a power rating greater than 100 megavolt amperes (MVA), and
   wherein at least one of the transformer modules includes the first primary winding, a second primary winding, a third primary winding, a fourth primary winding, the first secondary winding, a second secondary winding, a third secondary winding, and a fourth secondary winding, wherein the voltage ratio of the first primary winding to the second primary winding to the third primary winding to the fourth primary winding is 5:1:1:5, and wherein the voltage ratio of the first secondary winding to the second secondary winding to the third secondary winding to the fourth secondary winding is 5:1:1:5.

2. The matrix power transformer system of claim 1, wherein each transformer module includes a plurality of primary windings coupled in series or in parallel, and wherein each transformer module includes a plurality of second windings coupled in series or in parallel.

3. The matrix power transformer system of claim 2, wherein each input includes two input terminals, each input terminal being coupled to at least one terminal of another transformer module assembly, and wherein each output includes two output terminals, each output terminal being coupled to at least one terminal of another transformer module assembly.

4. The matrix power transformer system of claim 3, wherein the plurality of transformer modules assemblies includes a first set of transformer module assemblies with inputs coupled in series and a second set of transformer module assemblies with inputs coupled in series, and wherein the first set of transformer module assemblies and the second set of transformer module assemblies are coupled in parallel.

5. The matrix power transformer system of claim 1, wherein each block assembly is structured to be enclosed by a tank.

6. The matrix power transformer system of claim 5, wherein the tank is structured to fit within an enclosure measuring 40 feet by eight feet by eight feet, six inches.

7. A modular power transformer having a power rating greater than 100 MVA comprising:
   a plurality of transformer blocks each including:
      an enclosure,
      a first set of block terminals,
      a second set of block terminals, and
      a plurality of transformer modules located within the enclosure, each module including:
         a first set of module terminals,
         a second set of module terminals,
         at least one primary winding coupled to the first set of module terminals,
         at least one secondary winding coupled to the second set of module terminals, and
         a transformer core,
      wherein the primary windings of the transformer modules in one transformer block are coupled together between the first set of block terminals and the secondary windings of the transformer modules in the same transformer block are coupled together between the second set of block terminals and
      wherein at least one of the transformer modules includes the first primary winding, a second primary winding, a third primary winding, a fourth primary winding, the first secondary winding, a second secondary winding, a third secondary winding, and a fourth secondary winding, wherein the voltage ratio of the first primary winding to the second primary winding to the third primary winding to the fourth primary winding is 5:1:1:5, and wherein the voltage ratio of the first secondary winding to the second secondary winding to the third secondary winding to the fourth secondary winding is 5:1:1:5.

8. The modular power transformer of claim 7, wherein each transformer block weighs less than or equal to 40 tons.

9. The modular power transformer of claim 7, wherein the primary windings of the transformer modules in one transformer block are coupled together in parallel, in series, or a combination thereof.

10. The modular power transformer of claim 7, wherein at least another one of the transformer modules includes the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1.

11. The modular power transformer of claim 7, wherein at least another one of the transformer modules includes the first primary winding, a second primary winding, a third primary winding, a fourth primary winding, and the secondary winding, wherein the voltage ratio of the first primary winding to the second primary winding to the third primary winding to the fourth primary winding is 5:1:1:5.

12. The modular power transformer of claim 7, wherein at least another one of the transformer modules includes the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the. first secondary winding to the second secondary winding to the third secondary winding to the fourth secondary winding to the fifth secondary winding to the sixth secondary winding is 1:1:1:1:1:1.

13. The modular power transformer of claim 7, wherein at least another one of the transformer modules includes the first primary winding, a second primary winding, a third primary winding, a fourth primary winding, a fifth primary winding, a sixth primary winding, the first secondary winding, and a second secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding is 1:1.

14. The modular power transformer of claim 7, wherein at least another one of the transformer modules includes the first primary winding, a second primary winding, a third primary winding, a fourth primary winding, a fifth primary winding, a sixth primary winding, and the first secondary winding, wherein the voltage ratio of the first primary winding to the second primary winding to the third primary winding to the fourth primary winding to the fifth primary winding to the sixth primary winding is 1:1:1:1:1:1.

15. The modular power transformer of claim 7, wherein one or more of the plurality of blocks includes a flexible impedance or flexible voltage module.

16. A method for assembling a modular power transformer comprising:
  selecting a plurality of transformer modules from a set of standardized transformer modules, each standardized transformer module including a primary winding, a secondary winding, and a core;
  assembling a plurality of transformer blocks by coupling sets of the selected plurality of transformer modules, the weight of each transformer block being equal to or less than 40 tons;
  separately transporting each transformer block to a remote location; and
  coupling each of the transformer blocks together at the remote location between an AC power source and a load to form the modular power transformer including a power rating greater than 100 megavolt-amperes (MVA) and
  wherein the set of standardized transformer modules includes a first standardized transformer module including the first primary winding, a second primary winding, a third primary winding, a fourth primary winding, the first secondary winding, a second secondary winding, a third secondary winding, and a fourth secondary winding, wherein the voltage ratio of the first primary winding to the second primary winding to the third primary winding to the fourth primary winding is 5:1:1:5, and wherein the voltage ratio of the first secondary winding to the second secondary winding to the third secondary winding to the fourth secondary winding is 5:1:1:5.

17. The method of claim 16, wherein the set of standardized transformer modules includes a second standardized transformer module including the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1.

18. The method of claim 16, wherein the set of standardized transformer modules includes a second standardized transformer module including the first primary winding, a second primary winding, a third primary winding, a fourth primary winding, and the secondary winding, wherein the voltage ratio of the first primary winding to the second primary winding to the third primary winding to the fourth primary winding is 5:1:1:5.

19. The method of claim 16, wherein the set of standardized transformer modules includes a second standardized transformer module including the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1.

20. The method of claim 19, wherein the set of standardized transformer modules includes a second standardized transformer module including the first primary winding, a second primary winding, a third primary winding, a fourth primary winding, a fifth primary winding, a sixth primary winding, the first secondary winding, and a second secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding is 1:1.

21. The method of claim 19, wherein the set of standardized transformer modules includes a second standardized transformer module including the first primary winding, a second primary winding, a third primary winding, a fourth primary winding, a fifth primary winding, a sixth primary winding, and the first secondary winding, wherein the voltage ratio of the first primary winding to the second primary winding to the third primary winding to the fourth primary winding to the fifth primary winding to the sixth primary winding is 1:1:1:1:1:1.

22. A matrix power transformer system comprising:
a plurality of block assemblies each including a plurality of transformer modules, each transformer module including a primary winding coupled to an input and a secondary winding coupled to an output, the inputs of each transformer module in one block assembly being coupled together and the outputs of each transformer block being coupled together,
wherein one of the secondary windings includes a plurality of taps structured to be selectively coupled to the output of the associated transformer module or another secondary winding of the associated transformer module,
wherein each block assembly is structured to weigh less than 40 tons, and
wherein the matrix power transformer system has a power rating greater than 100 megavolt-amperes (MVA), and
wherein at least one of the transformer modules includes the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1.

23. The matrix power transformer system of claim 22, wherein each block assembly is structured to be enclosed by a tank.

24. The matrix power transformer system of claim 23, wherein the tank is structured to fit within an enclosure measuring 40 feet by eight feet by eight feet, six inches.

25. A matrix power transformer system comprising:
a plurality of block assemblies each including a plurality of transformer modules, each transformer module including a primary winding coupled to an input and a secondary winding coupled to an output, the inputs of each transformer module in one block assembly being coupled together and the outputs of each transformer block being coupled together,
wherein one of the secondary windings includes a plurality of taps structured to be selectively coupled to the output of the associated transformer module or another secondary winding of the associated transformer module,
wherein each block assembly is structured to weigh less than 40 tons, and
wherein the matrix power transformer system has a power rating greater than 100 megavolt-amperes (MVA), and
wherein at least one of the transformer modules includes the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1.

26. The matrix power transformer of claim 25, wherein each block assembly is structured to be enclosed by a tank.

27. The matrix power transformer of claim 26, wherein the tank is structured to fit within an enclosure measuring 40 feet by eight feet by eight feet, six inches.

28. A modular power transformer having a power rating greater than 100 MVA comprising:
a plurality of transformer blocks each including:
an enclosure,
a first set of block terminals,
a second set of block terminals, and
a plurality of transformer modules located within the enclosure, each module including:
a first set of module terminals,
a second set of module terminals,
at least one primary winding coupled to the first set of module terminals,
at least one secondary winding coupled to the second set of module terminals, and
a transformer core,
wherein the primary windings of the transformer modules in one transformer block are coupled together between the first set of block terminals and the secondary windings of the transformer modules in the same transformer block are coupled together between the second set of block terminals, and
wherein at least one of the transformer modules includes the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1.

29. The modular power transformer of claim 28, wherein each transformer block weighs less than or equal to 40 tons.

30. A modular power transformer having a power rating greater than 100 MVA comprising:
a plurality of transformer blocks each including:
an enclosure,
a first set of block terminals,
a second set of block terminals, and a plurality of transformer modules located within the enclosure, each module including:
a first set of module terminals,
a second set of module terminals,
at least one primary winding coupled to the first set of module terminals,
at least one secondary winding coupled to the second set of module terminals, and
a transformer core,
wherein the primary windings of the transformer modules in one transformer block are coupled together between the first set of block terminals and the secondary windings of the transformer modules in the same transformer block are coupled together between the second set of block terminals, and
wherein at least one of the transformer modules includes the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1.

31. The modular power transformer of claim 30, wherein each transformer block weighs less than or equal to 40 tons.

32. A method for assembling a modular power transformer comprising:
selecting a plurality of transformer modules from a set of standardized transformer modules, each standardized transformer module including a primary winding, a secondary winding, and a core;
assembling a plurality of transformer blocks by coupling sets of the selected plurality of transformer modules, the weight of each transformer block being equal to or less than 40 tons;
separately transporting each transformer block to a remote location; and
coupling each of the transformer blocks together at the remote location between an AC power source and a load to form the modular power transformer including a power rating greater than 100 megavolt-amperes (MVA), and
wherein the set of standardized transformer modules includes a second standardized transformer module including the first primary winding, a second primary winding, a third primary winding, a fourth primary winding, the first secondary winding, and a second secondary winding, wherein the voltage ratio of the first primary winding to the second primary winding to the third primary winding to the fourth primary winding is 5:1:1:5, and wherein the voltage ratio of the first secondary winding to the second secondary winding is 1:1.

33. A method for assembling a modular power transformer comprising:
selecting a plurality of transformer modules from a set of standardized transformer modules, each standardized transformer module including a primary winding, a secondary winding, and a core; assembling a plurality of transformer blocks by coupling sets of the selected plurality of transformer modules, the weight of each transformer block being equal to or less than 40 tons;
separately transporting each transformer block to a remote location; and
coupling each of the transformer blocks together at the remote location between an AC power source and a load to form the modular power transformer including a power rating greater than 100 megavolt-amperes (MVA), and
wherein the set of standardized transformer modules includes a first standardized transformer module including the first primary winding, a second primary winding, a third primary winding, a fourth primary winding, a fifth primary winding, a sixth primary winding, the first secondary winding, a second secondary winding, a third secondary winding, a fourth secondary winding, a fifth secondary winding, and a sixth secondary winding, wherein the voltage ratio of the first primary winding to the second primary winding to the third primary winding to the fourth primary winding to the fifth primary winding to the sixth primary winding is 1:1:1:1:1:1, and wherein the voltage ratio of the first secondary winding to the second secondary winding to the third secondary winding to the fourth secondary winding to the fifth secondary winding to the sixth secondary winding is 1:1:1:1:1:1.

* * * * *